(12) United States Patent
Sekiya

(10) Patent No.: US 12,465,195 B2
(45) Date of Patent: Nov. 11, 2025

(54) ATTACHMENT, ENDOSCOPE SYSTEM, AND METHOD FOR PERFORMING SUCTION BY ENDOSCOPE

(71) Applicant: OLYMPUS MEDICAL SYSTEMS CORP., Tokyo (JP)

(72) Inventor: Kei Sekiya, Sagamihara (JP)

(73) Assignee: Olympus Medical Systems Corp., Tokyo (JP)

( * ) Notice: Subject to any disclaimer, the term of this patent is extended or adjusted under 35 U.S.C. 154(b) by 366 days.

(21) Appl. No.: 18/113,651

(22) Filed: Feb. 24, 2023

(65) Prior Publication Data

US 2023/0270318 A1 Aug. 31, 2023

Related U.S. Application Data

(60) Provisional application No. 63/313,880, filed on Feb. 25, 2022.

(51) Int. Cl.
*A61B 1/00* (2006.01)
*A61B 1/015* (2006.01)
*A61B 1/018* (2006.01)

(52) U.S. Cl.
CPC ...... *A61B 1/00068* (2013.01); *A61B 1/00105* (2013.01); *A61B 1/00119* (2013.01); *A61B 1/00128* (2013.01); *A61B 1/00137* (2013.01); *A61B 1/015* (2013.01); *A61B 1/018* (2013.01)

(58) Field of Classification Search
CPC ............ A61B 1/00068; A61B 1/00105; A61B 1/00119; A61B 1/00128; A61B 1/00137; A61B 1/015; A61B 1/018; A61B 1/00094
See application file for complete search history.

(56) References Cited

U.S. PATENT DOCUMENTS

| | | | |
|---|---|---|---|
| 4,417,874 A | * | 11/1983 | Andersson ............. A61C 17/08 433/96 |
| 8,251,945 B2 | | 8/2012 | Secrest et al. |
| 2007/0232859 A1 | * | 10/2007 | Secrest .................. A61B 1/015 600/156 |

(Continued)

FOREIGN PATENT DOCUMENTS

| JP | 3330711 B2 | 9/2002 |
|---|---|---|
| JP | 2009-527337 A | 7/2009 |
| JP | 5953455 B1 | 7/2016 |

*Primary Examiner* — Timothy J Neal
(74) *Attorney, Agent, or Firm* — Morgan, Lewis & Bockius LLP

(57) ABSTRACT

A suction attachment includes a plug including a plug conduit, a first tube including a first conduit having a first end portion and a second end portion, a second tube having a second conduit including a third end portion and a fourth end portion, and a pressure regulator including a body with an interior cavity, a first opening, a second opening, and an actuator. The pressure regulator is connected to the fourth end portion and the interior cavity is in fluid communication with second conduit via the first opening in the body, and the second opening in the body connects the interior cavity to atmosphere. The actuator is movable between a first position and a second position, when the actuator is in the first position, the second opening is open and, when the actuator is in the second position, the second opening is closed.

21 Claims, 26 Drawing Sheets

(56) References Cited

U.S. PATENT DOCUMENTS

| | | | |
|---|---|---|---|
| 2008/0269560 A1* | 10/2008 | Ito | A61B 1/00119 |
| | | | 600/132 |
| 2016/0220097 A1* | 8/2016 | Ohno | A61B 1/00066 |
| 2017/0035273 A1 | 2/2017 | Yasunaga | |
| 2017/0079520 A1* | 3/2017 | Huang | A61B 1/045 |

* cited by examiner

ATTACHMENT, ENDOSCOPE SYSTEM, AND METHOD FOR PERFORMING SUCTION BY ENDOSCOPE

RELATED APPLICATION DATA

This application is based on and claims priority under 35 U.S.C. § 119 to U.S. Provisional Application No. 63/313,880 filed on Feb. 25, 2022, the entire contents of which are incorporated herein by reference.

FIELD OF THE DISCLOSURE

The present disclosure relates to an attachment for switching between on and off of a negative pressure introduced into a conduit of an endoscope, to an endoscope system, and to a method for performing suction by an endoscope.

BACKGROUND

In general, a suction tube (first suction tube) is provided in an operation portion of an endoscope. One end side of the first suction tube is connected to a conduit, such as a treatment instrument channel inserted through an insertion portion. The other end side of the first suction tube is connected to one end side of another suction tube (second suction tube) via a suction button (suction switching valve). The other end side of the second suction tube is inserted through the inside of a universal cable. Further, the other end side of the second suction tube is connectable to a suction pump via an endoscope connector. When the suction pump connected to the endoscope connector is driven and when the suction button is pressed, a negative pressure is introduced into the treatment instrument channel or the like. Therefore, an object to be suctioned, such as body fluid, cleaning liquid, and biological tissue, generated during treatment that uses the endoscope is suctioned via the treatment instrument channel or the like.

Various internal components are provided in the operation portion. Due to a layout that prevents interference with these internal components, in an endoscope where an inner diameter of a treatment instrument channel is sufficiently larger than an inner diameter of a first suction tube, restrictions may be imposed on flowing of an object to be suctioned in the first suction conduit. Accordingly, in the endoscope where the first suction tube is connected to the treatment instrument channel, there may be a case where good performance of suctioning an object to be suctioned cannot be exhibited.

To handle such a situation, Japanese Patent No. 3330711, for example, discloses a configuration where an insertion-portion-side suction conduit and a hand-side-suction conduit are connected to a suction switching valve at a position exterior to an operation portion, the insertion-portion-side suction conduit being connected to an inlet of a forceps channel via a forceps plug, the hand-side-suction conduit being located at a position on a side of a universal cord portion. Such a configuration allows a configuration where an inner diameter of the insertion-portion-side suction conduit and an inner diameter of the hand-side-suction conduit are set to be equal to or larger than an inner diameter of the treatment instrument channel.

SUMMARY OF THE DISCLOSURE

A suction attachment according to one aspect of the present disclosure includes: a plug including a plug conduit; a first tube including a first conduit therein, wherein the first tube has a first end portion and a second end portion and wherein the second end portion connects to the plug with the first conduit in fluid communication with the plug conduit; a second tube including a second conduit therein, wherein the second tube has a third end portion and a fourth end portion and wherein the third end portion connects to the plug with the second conduit in fluid communication with the plug conduit; and a pressure regulator including a body with an interior cavity, a first opening, a second opening, and an actuator, wherein the pressure regulator is connected to the fourth end portion of the second tube and the interior cavity is in fluid communication with second conduit via the first opening in the body. The second opening in the body connects the interior cavity to atmosphere. The actuator is movable between a first position and a second position. When the actuator is in the first position, the second opening is open and, when the actuator is in the second position, the second opening is closed.

DETAILED DESCRIPTION

In general, a member, such as a suction switching valve, of an endoscope is mounted on an operation portion at a position in the vicinity of a bending knob. Accordingly, in a case where a suction communication conduit, which is connected to a treatment instrument channel or the like via a pipe sleeve, is connected to a suction pump via the suction switching valve at a position exterior to the operation portion, there may be a case where an operation of the bending knob or other switches may be affected.

According to embodiments described below, it is possible to exhibit good performance of suctioning an object to be suctioned while good operability of the endoscope is ensured.

Figure 1:
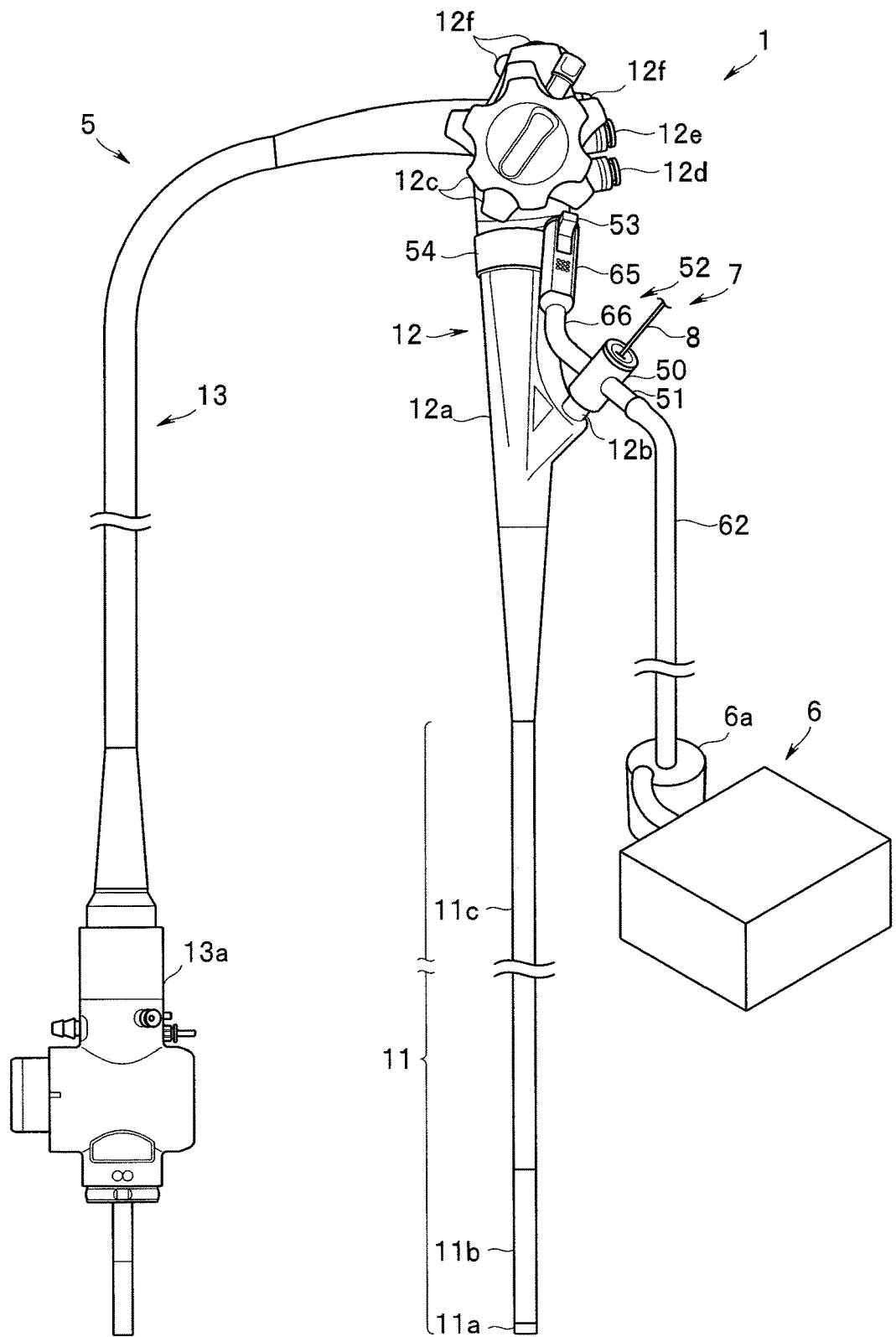
FIG. 1 is a diagram according to a first embodiment, and shows a schematic configuration of an endoscope system.
Figure 2:
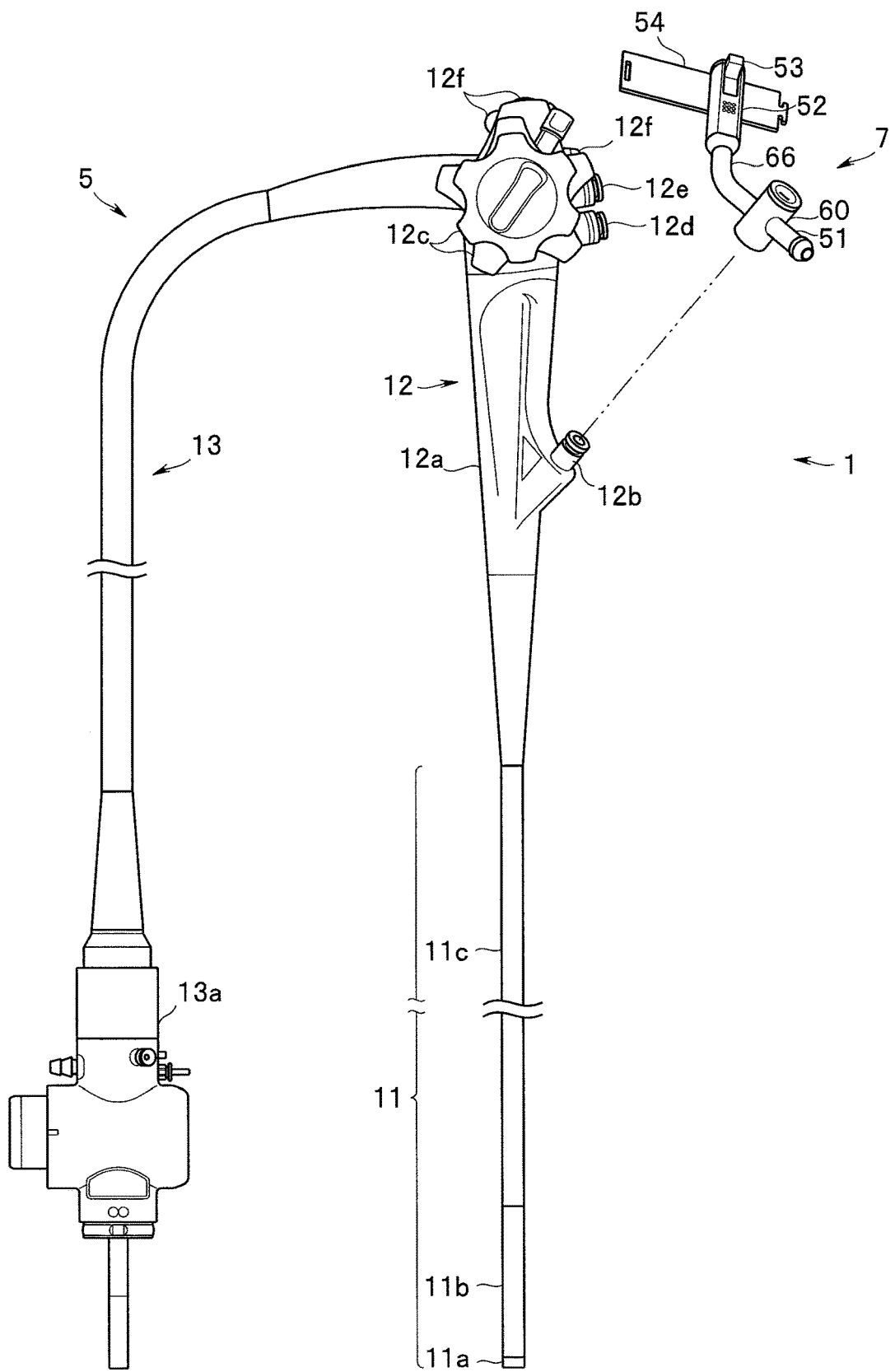
FIG. 2 is a side view according to the first embodiment, and shows an endoscope from which a suction switching unit is removed.

Hereinafter, embodiments of the present disclosure will be described with reference to drawings. FIG. 1 to FIG. 9 relate to a first embodiment of the present disclosure, and FIG. 1 is a diagram showing a schematic configuration of an endoscope system. In the drawings used in the description made hereinafter, each constitutional element has a different scale to allow each constitutional element to have a size that can be perceived in the drawings. Accordingly, the present disclosure is not limited to the number of constitutional elements, the shapes of the constitutional elements, the size ratio between the constitutional elements, or the relative positional relationship between the respective constitutional elements described in the drawings.

An endoscope system 1 shown in FIG. 1 includes an endoscope 5, a suction pump 6, and a suction switching unit (suction attachment) 7 as an attachment.

The endoscope 5 includes an insertion portion 11, an operation portion (grasping portion) 12, and a universal cable 13.

The insertion portion 11 includes a distal end portion 11a, a bending portion 11b, and a flexible tube portion 11c. The distal end portion 11a, the bending portion 11b, and the flexible tube portion 11c are provided in this order from a distal end side toward a proximal end side of the insertion portion 11.

The distal end portion 11a includes, for example, an illumination optical system (not shown in the drawing), an image pickup unit (not shown in the drawing), a nozzle 18a (see FIG. 3), and a distal-end-side opening 14a of a treatment instrument channel 14 (see FIG. 3), the nozzle 18a being provided on a distal end of a gas/liquid feeding channel.

The illumination optical system irradiates a subject with illumination light transmitted from a light source device, which is not shown in the drawing, via a light guide, for example.

The image pickup unit includes an image pickup optical system and an image pickup device. The image pickup optical system forms, as an optical image, light reflected from the subject that is irradiated with the illumination light. The image pickup device picks up the optical image, formed by the image pickup optical system, to generate an image pickup signal. The image pickup signal generated by the image pickup device is outputted through a signal cable connected to the image pickup unit.

A distal end of the nozzle 18a is directed toward an objective lens provided on a distal end of the image pickup optical system. With such a configuration, the nozzle 18a can spray the objective lens with gas or liquid supplied through the gas/liquid feeding channel 18.

The treatment instrument channel 14 guides a treatment instrument 8 to the distal-end-side opening 14a, the treatment instrument 8 being inserted into the treatment instrument channel 14 from an operation portion 12 side. The treatment instrument 8 that is caused to protrude from the distal-end-side opening 14a can perform various treatments on the subject. The treatment instrument channel 14 also has a function as a suction conduit through which an object to be suctioned, such as body fluid, cleaning liquid, and biological tissue, is suctioned from the inside of the subject. An inner diameter of the treatment instrument channel 14 of the present embodiment is set to be larger than an inner diameter of a treatment instrument channel used in general. For example, in an endoscope for digestive organs, an inner diameter of a general treatment instrument channel is 4.2 mm. In contrast, the inner diameter of the treatment instrument channel 14 of the present embodiment is set to be larger than 4.2 mm. More specifically, the inner diameter of the treatment instrument channel 14 of the present embodiment is set to 6 mm, for example. In the present embodiment, a configuration of the treatment instrument channel 14 is illustrated that has the inner diameter set to be larger than the inner diameter of the general treatment instrument channel. However, the treatment instrument channel 14 is not limited to a channel with an inner diameter set to be larger than the inner diameter of the general treatment instrument channel.

The bending portion 11b is configured to be bendable in four directions of an upward direction, a downward direction, a leftward direction, and a rightward direction, for example. When the bending portion 11b is bent, a direction of the distal end portion 11a changes. Therefore, a direction of observation by the image pickup unit changes. The bending portion 11b is also bent to increase ease of insertion of the insertion portion 11 in the subject. In the present embodiment, the configuration where the bending portion 11b is bendable in the four directions is taken as an example. However, the bending portion 11b may have a configuration that is bendable in two directions. Further, the endoscope 5 may be of a type that is not provided with the bending portion 11b.

The flexible tube portion 11c is a flexible tube portion that deflects in conformity with a shape of the subject into which the insertion portion 11 is inserted. In the present embodiment, a flexible endoscope that includes the flexible tube portion 11c is taken as an example of the endoscope 5. However, the endoscope 5 may be a rigid endoscope including a rigid tube portion.

The operation portion 12 is continuously provided to a proximal end side of the insertion portion 11. The operation portion 12 includes a grasping portion 12a that can be gripped by an operator or the like with a hand.

The operation portion 12 includes a treatment instrument insertion pipe sleeve (socket) 12b at a position closer to a distal end side than the grasping portion 12a. The pipe sleeve 12b is connected to the treatment instrument channel 14 in the operation portion 12. With such a configuration, the operator or the like can insert various treatment instruments 8 from the pipe sleeve 12b, and can cause the treatment instruments 8 to protrude from the distal-end-side opening 14a. Examples of the treatment instrument 8 that is inserted from the pipe sleeve 12b include biopsy forceps, a high frequency snare, and the like. The suction conduit has an endoscope suction conduit provided in the insertion portion. The socket 12b is provided between the insertion portion 11 and the grasping portion 12, and communicates with the endoscope suction conduit.

The suction switching unit 7, which will be described later, can be removably mounted on the pipe sleeve 12b.

The operation portion 12 includes bending operation levers 12c, a gas/liquid feeding button 12d, a suction button 12e, a button switch 12f and the like at positions closer to a proximal end side than the grasping portion 12a.

The bending operation levers 12c are operation members for performing a bending operation of the bending portion 11b.

The gas/liquid feeding button 12d is an operation button for feeding gas or liquid to the objective lens, disposed at the distal end portion 11a, via the gas/liquid feeding channel.

The suction button 12e is an operation button for suctioning an object to be suctioned from the distal end portion 11a via the treatment instrument channel 14 and a suction channel (which will be described later). Although the detail will be described later, the endoscope system 1 of the present embodiment can suction the object to be suctioned by using the suction switching unit 7 without via the suction button 12e or the suction channel. Accordingly, it is possible to suitably omit components, such as the suction button 12e and the suction channel, from the endoscope 5. Alternatively, in a configuration where the endoscope 5 is provided with the suction button 12e, the suction channel, and the like, according to a kind, an amount, and the like of an object to be suctioned, it is possible to selectively use suction where the object to be suctioned is caused to pass through the suction button 12e, the suction channel and the like, or suction where the object to be suctioned is caused to pass through the suction switching unit 7.

Any operation for performing various functions of the endoscope 5 can be allocated to the button switch 12f. For example, an operation relating to an image pickup function can be allocated to the button switch 12f.

The universal cable 13 extends from a proximal end side of the operation portion 12, for example. The universal cable 13 is a connection cable for connecting the endoscope 5 to the light source device, a processor, a liquid feeding tank, the suction pump 6, and the like. For this reason, the above-mentioned light guide, signal cable, gas/liquid feeding channel, suction channel, and the like are inserted through the universal cable 13.

An endoscope connector 13a is provided at an extension end of the universal cable 13. The endoscope connector 13a is connectable to various devices, such as the light source device (not shown in the drawing), the processor (not shown in the drawing), the liquid feeding tank (not shown in the drawing), and the suction pump 6, the light source device being provided with a gas feeding pump, the suction pump 6 serving as a suction device.

Next, a configuration of the conduit in the endoscope 5 will be described with reference to FIG. 3.

Figure 3:
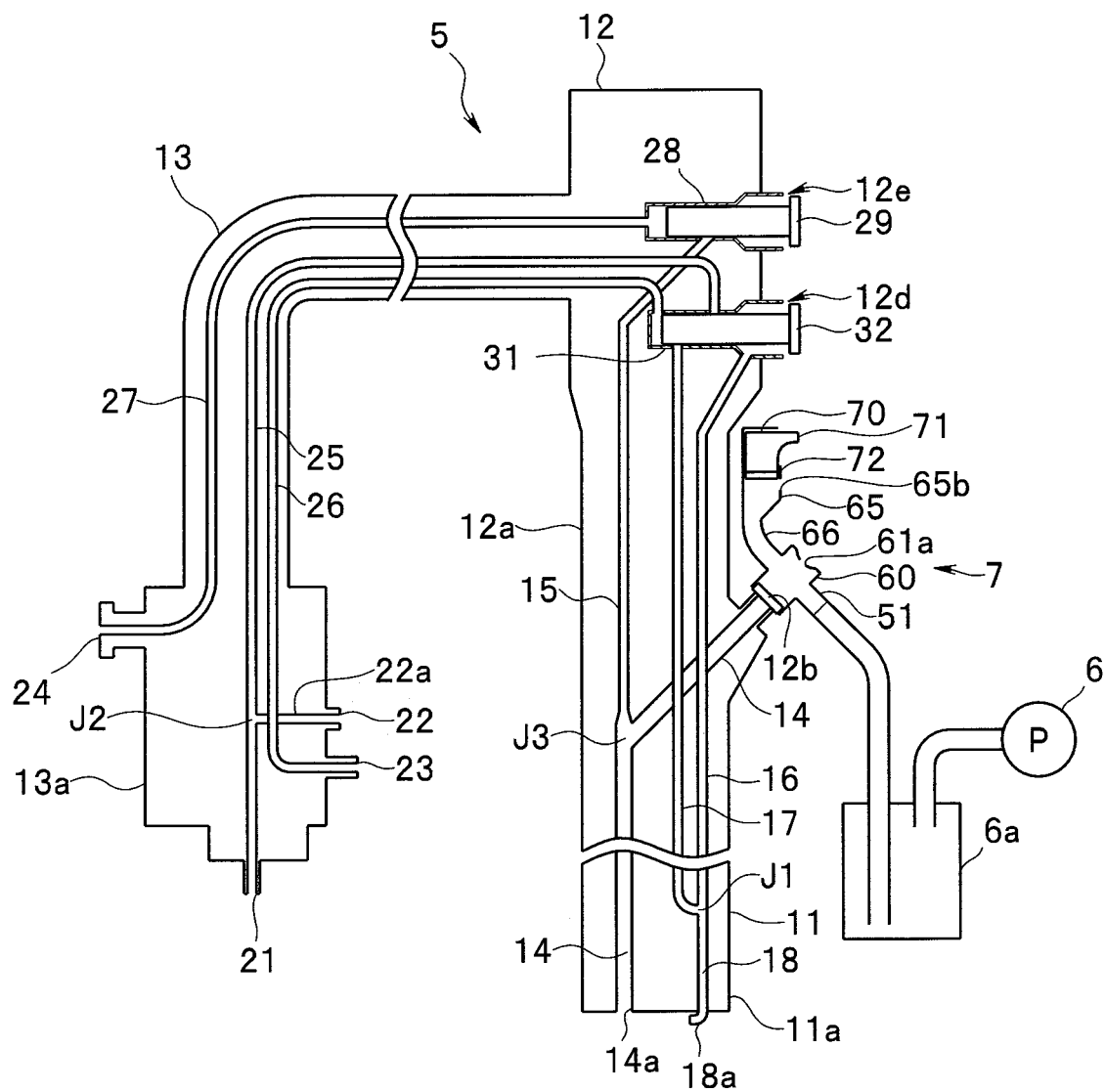
FIG. 3 is an explanatory diagram according to the first embodiment, and shows a configuration of a conduit of the endoscope system.
Figure 4:
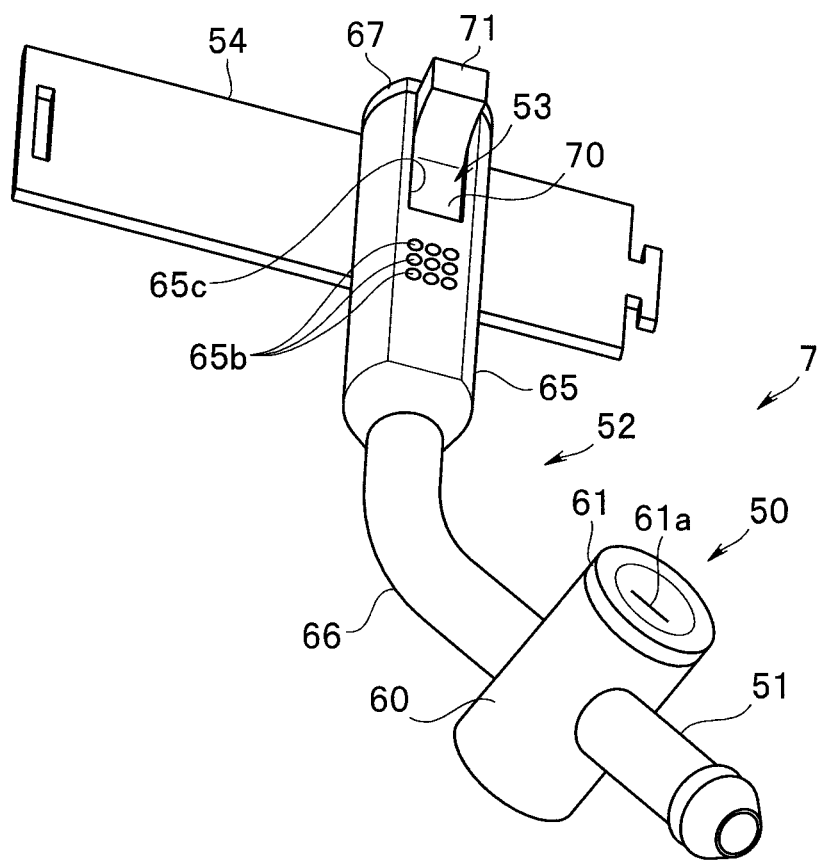
FIG. 4 is a perspective view according to the first embodiment, and shows the suction switching unit.
Figure 5:
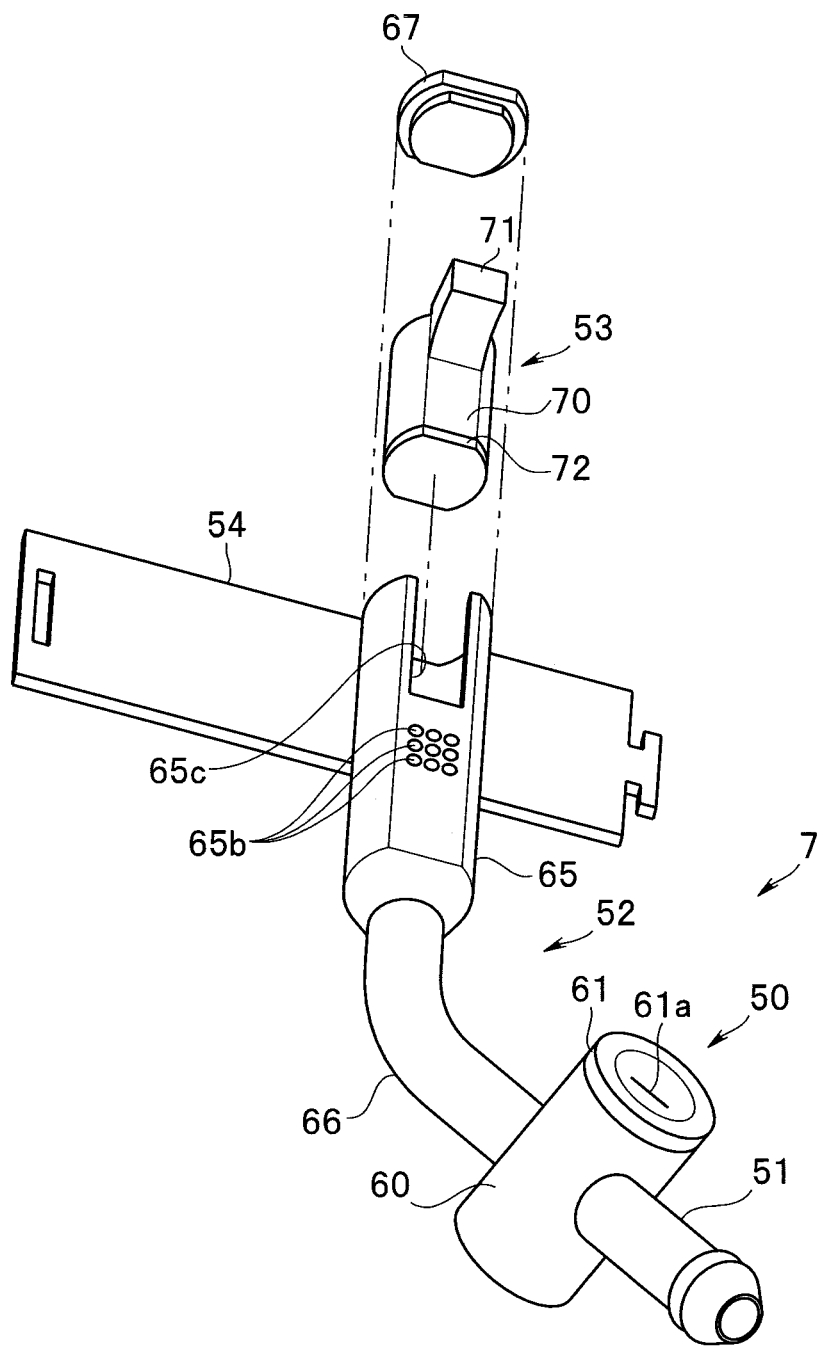
FIG. 5 is an exploded perspective view according to the first embodiment, and shows the suction switching unit.

As shown in FIG. 3, the suction channel includes a first suction tube (suction conduit) 15 and a second suction tube (suction conduit) 27. The first suction tube 15 extends through the inside of the operation portion 12 and the insertion portion 11 from the suction button 12e. The second suction tube 27 extends through the inside of the universal cable 13 from the suction button 12e.

The first suction tube 15 merges the treatment instrument channel 14 at a merging portion J3 set in the inside of the insertion portion 11. Therefore, the first suction tube 15 is made to communicate with the distal-end-side opening 14a of the treatment instrument channel 14. As described above, a proximal end side of the treatment instrument channel 14 is made to communicate with a space external to the operation portion 12 via the pipe sleeve 12b.

As shown in FIG. 3, in the present embodiment, each of an inner diameter of the first suction tube 15 and an inner diameter of the second suction tube 27 is smaller than the inner diameter of the treatment instrument channel 14.

The gas/liquid feeding channel includes a gas feeding conduit 16 and a liquid feeding conduit 17, and the gas/liquid feeding channel 18, the gas feeding conduit 16 and the liquid feeding conduit 17 extending through the inside of the operation portion 12 from the gas/liquid feeding button 12d, the gas/liquid feeding channel 18 extending through the inside of the insertion portion 11. The gas/liquid feeding channel also includes a gas supply conduit 25 and a liquid supply conduit 26 that extend through the inside of the universal cable 13 from the gas/liquid feeding button 12d. The gas feeding conduit 16 and the liquid feeding conduit 17 are made to communicate with the gas/liquid feeding channel 18 at a merging portion J1 set in the insertion portion 11. The gas/liquid feeding channel 18 is made to communicate with the nozzle 18a provided on the distal end portion 11a of the insertion portion 11.

The endoscope connector 13a includes a gas supply pipe sleeve 21, a gas feeding pipe sleeve 22, a liquid feeding pipe sleeve 23, and a suction pipe sleeve 24.

The gas supply pipe sleeve 21 communicates with the gas supply conduit 25. Pressurized gas from the pump in the light source device is supplied to the gas supply conduit 25 from the gas supply pipe sleeve 21.

A conduit 22a is connected to the gas feeding pipe sleeve 22. The conduit 22a merges the gas supply conduit 25 at a merging portion J2. The liquid feeding pipe sleeve 23 communicates with the liquid supply conduit 26. The gas feeding pipe sleeve 22 and the liquid feeding pipe sleeve 23 are connected to the liquid feeding tank via suitable conduits.

When the pressurized gas is supplied to the gas supply pipe sleeve 21 in a state where a portion of the gas supply conduit 25 that is disposed downstream of the merging portion J2 is closed, the gas flows into the liquid feeding tank from the merging portion J2 via the conduit 22a and the gas feeding pipe sleeve 22. The gas that flows into the liquid feeding tank pressurizes liquid that is stored in the liquid feeding tank. With such operations, the liquid is supplied to the liquid supply conduit 26 via the liquid feeding pipe sleeve 23.

The gas/liquid feeding button 12d is formed by combining a gas/liquid feeding cylinder 31 and a gas/liquid feeding piston 32 that is inserted into the gas/liquid feeding cylinder 31 in a state of being advanceable and retractable. The gas/liquid feeding cylinder 31 communicates with the gas supply conduit 25, the liquid supply conduit 26, the gas feeding conduit 16, and the liquid feeding conduit 17. The gas/liquid feeding button 12d switches between communication and cutting-off between the gas supply conduit 25 and the gas feeding conduit 16 according to an advanced or retracted position of the gas/liquid feeding piston 32 with respect to the gas/liquid feeding cylinder 31. The gas/liquid feeding button 12d also switches between communication and cutting-off between the liquid supply conduit 26 and the liquid feeding conduit 17 according to an advanced or retracted position of the gas/liquid feeding piston 32 with respect to the gas/liquid feeding cylinder 31.

The suction pipe sleeve 24 communicates with the second suction tube 27. The suction button 12e is formed by combining a suction cylinder 28 and a suction piston 29 that is inserted into the suction cylinder 28 in a state of being advanceable and retractable. The suction cylinder 28 communicates with the first suction tube 15 and the second suction tube 27. The suction button 12e switches between communication and cutting-off between the first suction tube 15 and the second suction tube 27 according to an advanced or retracted position of the suction piston 29 with respect to the suction cylinder 28.

Next, a detailed configuration of the suction switching unit 7 will be described with reference to FIG. 2 to FIG. 7. The suction switching unit 7 is an attachment for introducing a suction negative pressure into the treatment instrument channel 14 from the outside of the operation portion 12. In other words, the suction switching unit 7 introduces a suction negative pressure from the suction pump 6 into the treatment instrument channel 14 without via the above-mentioned first suction tube 15 or second suction tube 27.

The suction switching unit 7 includes, for example, a forceps plug (plug) 50 serving as a connection member, a tube joint (first tube) 51 serving as a first tubular member, a leak tube (body) 52 serving as a second tubular member, a slider 53 serving as an opening/closing member, and a belt (attachment device) 54 serving as a fixing member.

The plug 50 includes a plug conduit. The first tube 51 includes a first conduit therein. The first tube 51 has a first end portion and a second end portion and the second end portion connects to the plug 50 with the first conduit in fluid communication with the plug conduit. A second tube 66 including a second conduit therein. The second tube 66 has a third end portion and a fourth end portion and the third end portion connects to the plug 50 with the second conduit in fluid communication with the plug conduit. A pressure regulator includes a body 52 with an interior cavity, a first opening 65a, a second opening 65b, and an actuator 53, the pressure regulator is connected to the fourth end portion of the second tube 66 and the interior cavity is in fluid communication with second conduit via the first opening in the body 52. The second opening in the body 52 connects the interior cavity to atmosphere. The actuator 53 is movable between a first position and a second position. When the actuator 53 is in the first position, the second opening 65b is open and, when the actuator 53 is in the second position, the second opening 65b is closed. The actuator 53 is movable between the first position and the second position by sliding with respect to the body 52 of the pressure regulator. The second opening 65b can be in an end wall or a side wall of the body 52 of the pressure regulator. The second opening 65b may comprise a plurality of holes. The second opening 65b allows gas to pass through, and prevents liquid from passing through. The actuator 53 can be movable between the first position and the second position by sliding in a direction of a longitudinal axis of the interior cavity.

The forceps plug 50 includes a forceps plug body 60 having a substantially cylindrical shape. The forceps plug body 60 is made of a rubber material or the like having elasticity, for example. The plug 50 includes a plug cavity and a third opening in fluid communication with the plug cavity, and the third opening is configured to attach to the treatment instrument insertion opening 12b of the endoscope 5. A flow path from the second opening 65b, through the interior cavity, the second conduit and the plug conduit, to the first conduit is a first flow path. A flow path from the third opening, through the plug conduit, to the first conduit is a second flow path. In operation with the actuator 53 in the first position, a flow rate of the first flow path is greater than a flow rate of the second flow path, and in operation with the actuator 53 in the second position, the flow rate of the first flow path is less than the flow rate of the second flow path.

Figure 6:
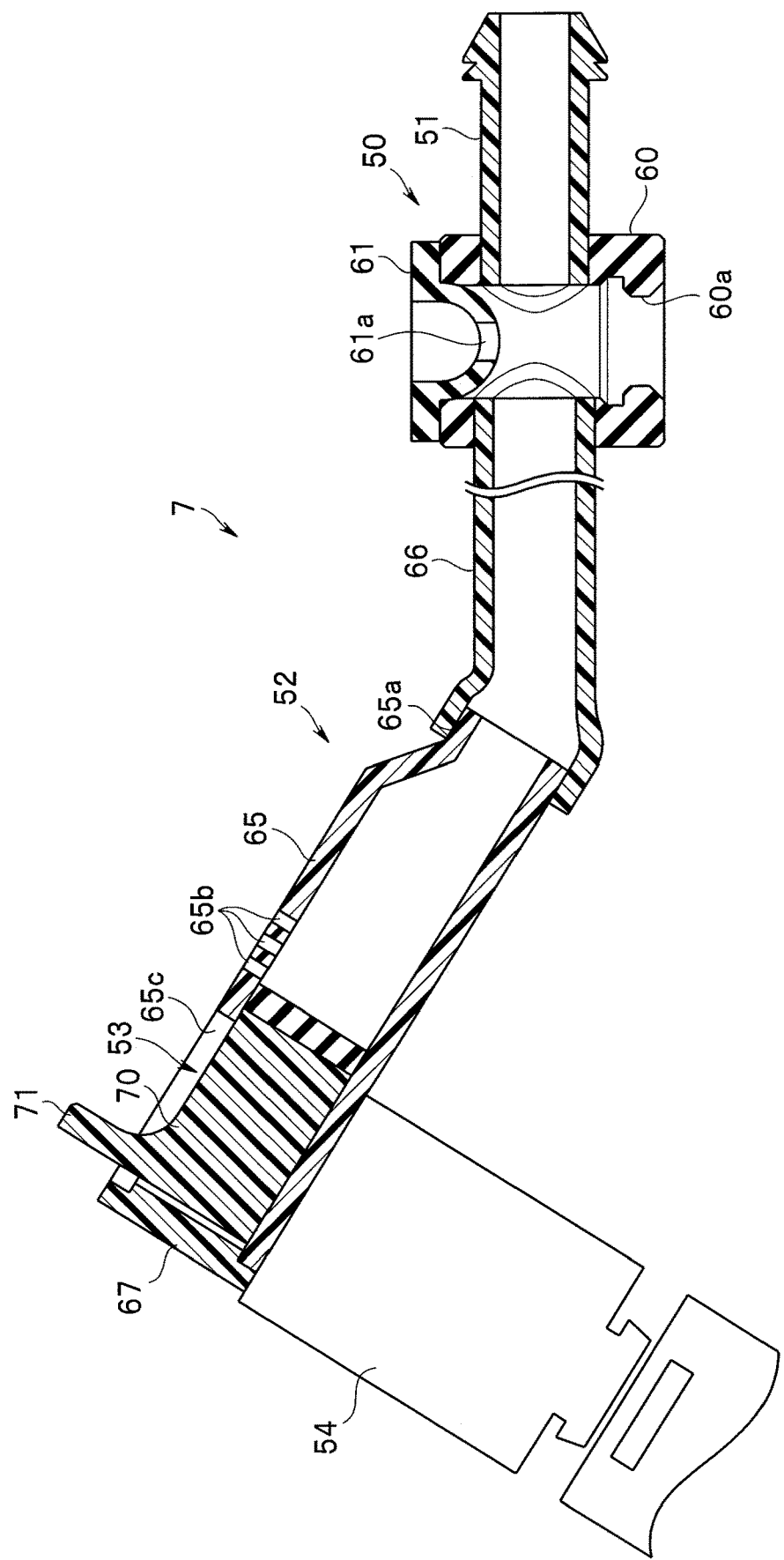
FIG. 6 is a cross-sectional view according to the first embodiment, and shows a main portion of the suction switching unit when suction is in an off state.
Figure 7:
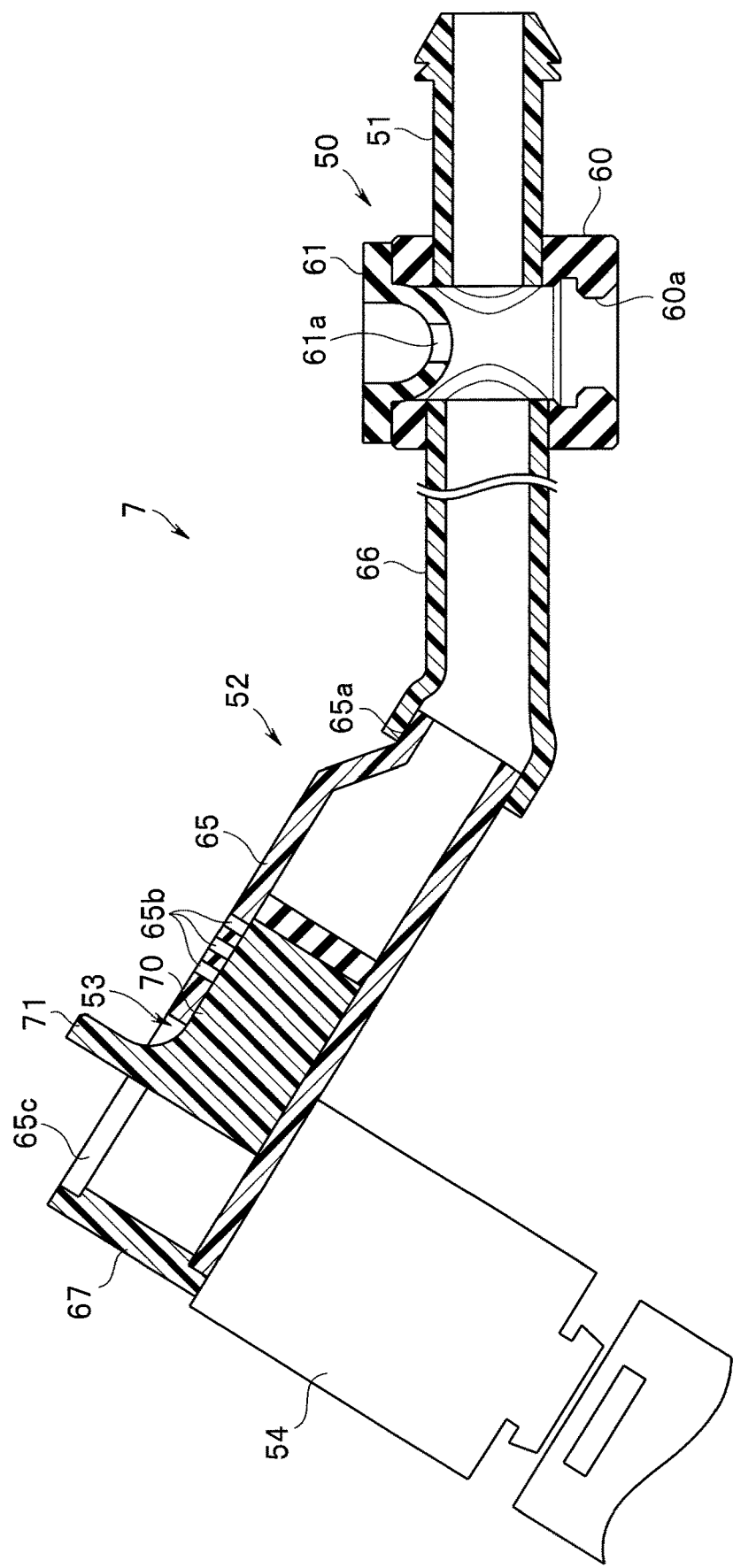
FIG. 7 is a cross-sectional view according to the first embodiment, and shows the main portion of the suction switching unit when the suction is in an on state.

A pipe sleeve connection portion 60a is provided at one end portion of the forceps plug body 60 (see FIGS. 6 and 7). The pipe sleeve connection portion 60a can be removably connected to the pipe sleeve 12b of the endoscope 5. The pipe sleeve connection portion 60a has multistage inner peripheral surfaces having different inner diameters, the multistage inner peripheral surfaces being formed at an inner portion of the forceps plug body 60 on one end side, for example. The respective inner peripheral surfaces forming the pipe sleeve connection portion 60a correspond to multistage outer peripheral surfaces formed on the pipe sleeve 12b. With such a configuration, the pipe sleeve connection portion 60a can be airtightly connected to the pipe sleeve 12b.

The other end portion of the forceps plug body 60 is airtightly closed by a closing member 61. The closing member 61 is made of a rubber material having elasticity, for example. A treatment instrument insertion opening (treatment instrument insertion opening) 61a having a slit shape, for example, is provided at a center portion of the closing member 61. When the treatment instrument 8 is not inserted into the treatment instrument insertion opening 61a, a pair of wall surfaces forming the treatment instrument insertion opening 61a having a slit shape are elastically brought into close contact with each other. Therefore, the treatment instrument insertion opening 61a is airtightly closed. In contrast, when the treatment instrument 8 is inserted through the treatment instrument insertion opening 61a, the treatment instrument insertion opening 61a is elastically expanded. At this point of operation, the wall surfaces forming the treatment instrument insertion opening 61a are elastically brought into close contact with a side surface of the treatment instrument 8. With such a configuration, the treatment instrument insertion opening 61*a* allows insertion of the treatment instrument 8 therethrough while maintaining an airtight state. The plug 50 may include a treatment instrument insertion opening 61*a* that allows the treatment instrument 8 to be inserted into the plug 50.

The tube joint 51 is formed of a rigid tubular member. One end side of the tube joint 51 is made to communicate with the inside of the forceps plug 50 at a side portion of the forceps plug body 60. The other end side of the tube joint 51 can be connected to the suction pump 6 via a negative pressure introduction tube 62 and a suction tank 6*a*, for example.

In the present embodiment, each of an inner diameter of the tube joint 51 and an inner diameter of the negative pressure introduction tube 62 can be set to be at least equal to or larger than the inner diameter of the treatment instrument channel 14. With such a configuration, the tube joint 51 and the negative pressure introduction tube 62 can guide an object to be suctioned that is suctioned into the treatment instrument channel 14 toward the suction pump 6 without causing clogging of the object to be suctioned in the tube joint 51 and the negative pressure introduction tube 62.

The leak tube 52 is a member for releasing negative pressure (suction negative pressure), introduced into the forceps plug 50 from the suction pump 6 via the tube joint 51, to the outside of the suction switching unit 7, that is, to the atmosphere. The leak tube 52 is configured to include a leak tube body 65 and a relay tube (second tube) 66.

The leak tube body 65 is made of a rigid resin material, and has a cylindrical shape, for example. A connection portion (first opening) 65*a* is formed at one end portion of the leak tube body 65, the connection portion 65*a* being connected to the relay tube 66.

A plurality of leak holes 65*b* as an opening are provided in a side portion of the leak tube body 65 at positions closer to the other end side than the connection portion 65*a*, for example. Each leak hole 65*b* is a hole for opening an internal space of the leak tube body 65 to an external space. In the present embodiment, each leak hole 65*b* may have a hole diameter that allows gas to pass through the leak hole 65*b* but prevents liquid from passing through the leak hole 65*b*, for example. In other words, each leak hole 65*b* have a hole diameter that can hold liquid, such as a drop of water, in the leak hole 65*b* by a surface tension of the liquid.

A key hole 65*c* is also provided in the side portion of the leak tube body 65 at a position closer to the other end side than the respective leak holes 65*b*. The key hole 65*c* extends in a zone ranging from an intermediate portion of the leak tube body 65 to the other end of the leak tube body 65 in an axial direction (a direction of a longitudinal axis) of the leak tube body 65.

A stopper member 67 is attached to the other end portion of the leak tube body 65. The stopper member 67 closes the other end of the leak tube body 65.

The relay tube 66 is made of a resin material having flexibility, for example. One end side of the relay tube 66 is made to communicate with the inside of the forceps plug 50 at the side portion of the forceps plug body 60. The other end side of the relay tube 66 is connected to the connection portion 65*a* of the leak tube body 65. Therefore, the relay tube 66 makes an internal space of the forceps plug 50 communicate with the internal space of the leak tube body 65.

In the present embodiment, an inner diameter of the leak tube body 65 and an inner diameter of the relay tube 66 may be set to be equal to or more than the inner diameter of the tube joint 51 and the inner diameter of the negative pressure introduction tube 62. An effective cross-sectional area obtained by summing the inner diameters of the respective leak holes 65*b* may be set to be equal to or more than a sum of the respective inner diameters (effective cross-sectional area) of the tube joint 51 and the negative pressure introduction tube 62.

The slider 53 includes a slider body 70, an operation member 71, and a packing 72 as a sealing member (seal). The slider body 70 and the operation member 71 are formed as an integral body by using a rigid resin material, for example. The actuator 53 includes the seal, in the second position, the seal seals the second opening 65*b*. The seal is located on an inner peripheral of the interior cavity. The second opening 65*b* is provided in an end wall of the body 52 of the pressure regulator. The seal is located on the actuator 53, and in the second position, the seal contacts the second opening 65*b*. The second opening 65*b* is in a side surface of the body 52 of the pressure regulator, and the seal is located on the actuator 53. In the second position, the seal contacts the second opening 65*b* on a surface of the interior cavity. In the second position, the seal 72 contacts the second opening 65*b* on a surface of the interior cavity.

The slider body 70 has a rod shape that allows the slider body 70 to move in the leak tube body 65 in the axial direction (the direction of the longitudinal axis) of the leak tube body 65, for example.

The operation member 71 protrudes outward in a radial direction of the slider body 70 on the other end side of the slider body 70. When the slider body 70 is inserted into the leak tube body 65, the operation member 71 is inserted through the key hole 65*c*.

With such a configuration, the slider 53 of the present embodiment can move forward or backward in the leak tube body 65 between a retraction position where the other end portion of the slider body 70 and the stopper member 67 are brought into contact with each other (see FIG. 6) and an advanced position where one end portion of the key hole 65*c* and the operation member 71 are brought into contact with each other (see FIG. 7).

The packing 72 is provided at one end portion of the slider body. The packing 72 is made of a rubber material having elasticity, for example. The packing 72 has a shape that allows the packing 72 to be brought into slide contact with an inner peripheral surface of the leak tube body 65. With such a configuration, the packing 72 can suitably close the internal space of the leak tube body 65.

Specifically, when the slider 53 (the slider body 70) is at the retraction position with respect to the leak tube body 65, the packing 72 is brought into slide contact with the inner peripheral surface of the leak tube body 65 at a position closer to the other end side than the respective leak holes 65*b* (see FIG. 6). Therefore, the internal space of the leak tube body 65 (the leak tube 52) is open to the atmosphere via the respective leak holes 65*b*. Accordingly, the negative pressure introduced into the forceps plug 50 from the suction pump 6 is released via the leak tube 52 without being introduced into the treatment instrument channel 14. In other words, suction performed by the endoscope 5 from the distal-end-side opening 14*a* is brought into an off state.

In contrast, when the slider 53 is at the advanced position with respect to the leak tube body 65, the packing 72 is brought into slide contact with the inner peripheral surface of the leak tube body 65 at a position closer to the one end side (the forceps plug 50 side) than the respective leak holes 65*b* (see FIG. 7). Therefore, the internal space of the leak tube body 65 (the leak tube 52) is closed. Accordingly, the negative pressure introduced into the forceps plug 50 from the suction pump 6 is introduced into the treatment instrument channel 14 without leaking from the respective leak holes 65b. In other words, suction performed by the endoscope 5 is brought into an on state.

The belt 54 is made of a rubber material having elasticity, for example. An intermediate portion of the belt 54 is fixed to the leak tube body 65, for example. The belt 54 can be wound around the operation portion 12 at any position. With such a configuration, the belt 54 can fix the leak tube 52 (the leak tube body 65) to the operation portion 12. The attachment device 54 is configured to attach the suction attachment 7 to a part of an endoscope 5. The attachment device 54 may include a hook including a concave portion or convex position that engages with the endoscope 5. The attachment device 54 may include magnetic material fixing to the endoscope 5. The attachment device 54 may include a hook-and-loop fastener.

Figure 8:
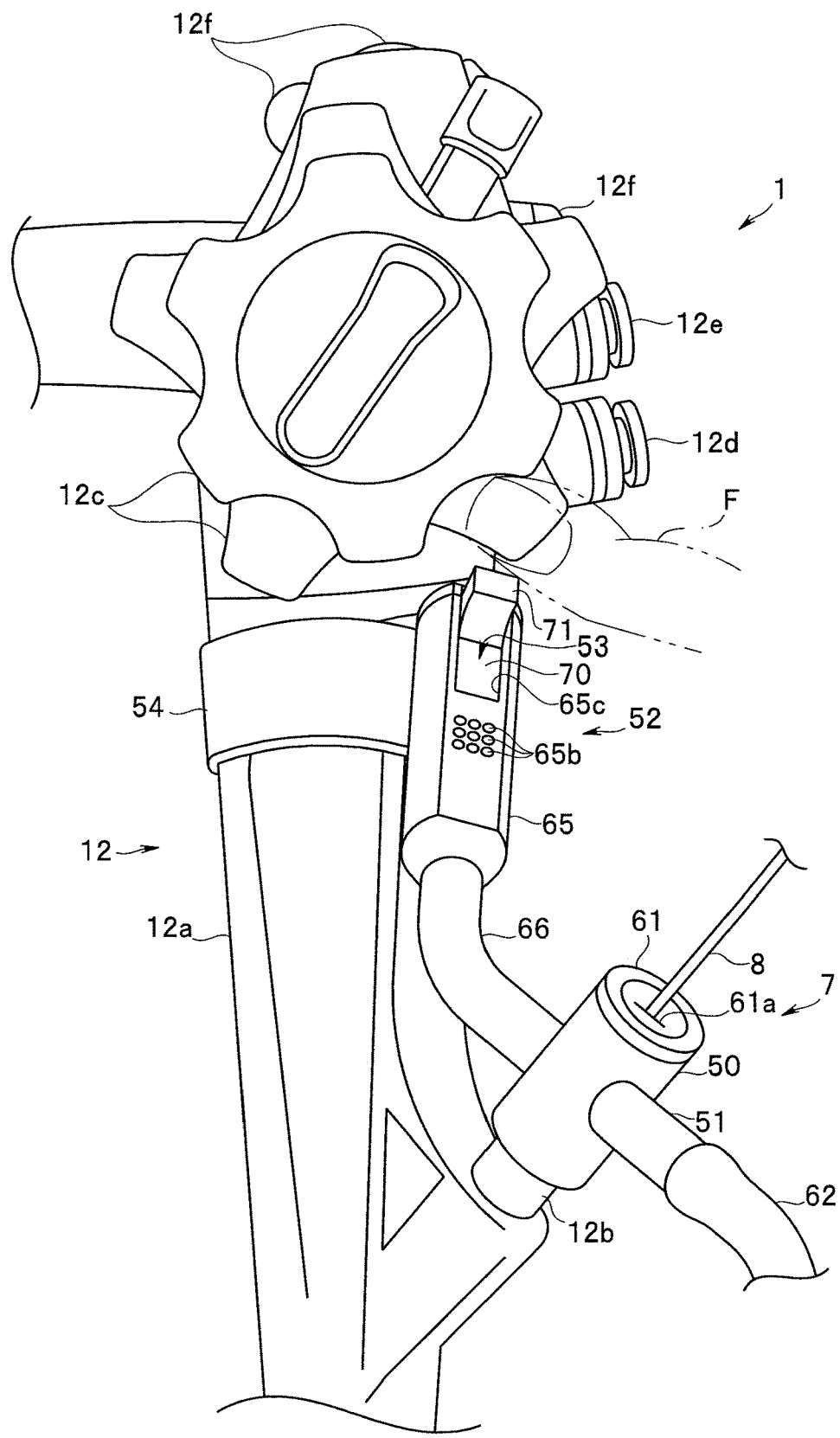
FIG. 8 is an explanatory diagram according to the first embodiment, and shows an operation mode of the suction switching unit.
Figure 9:
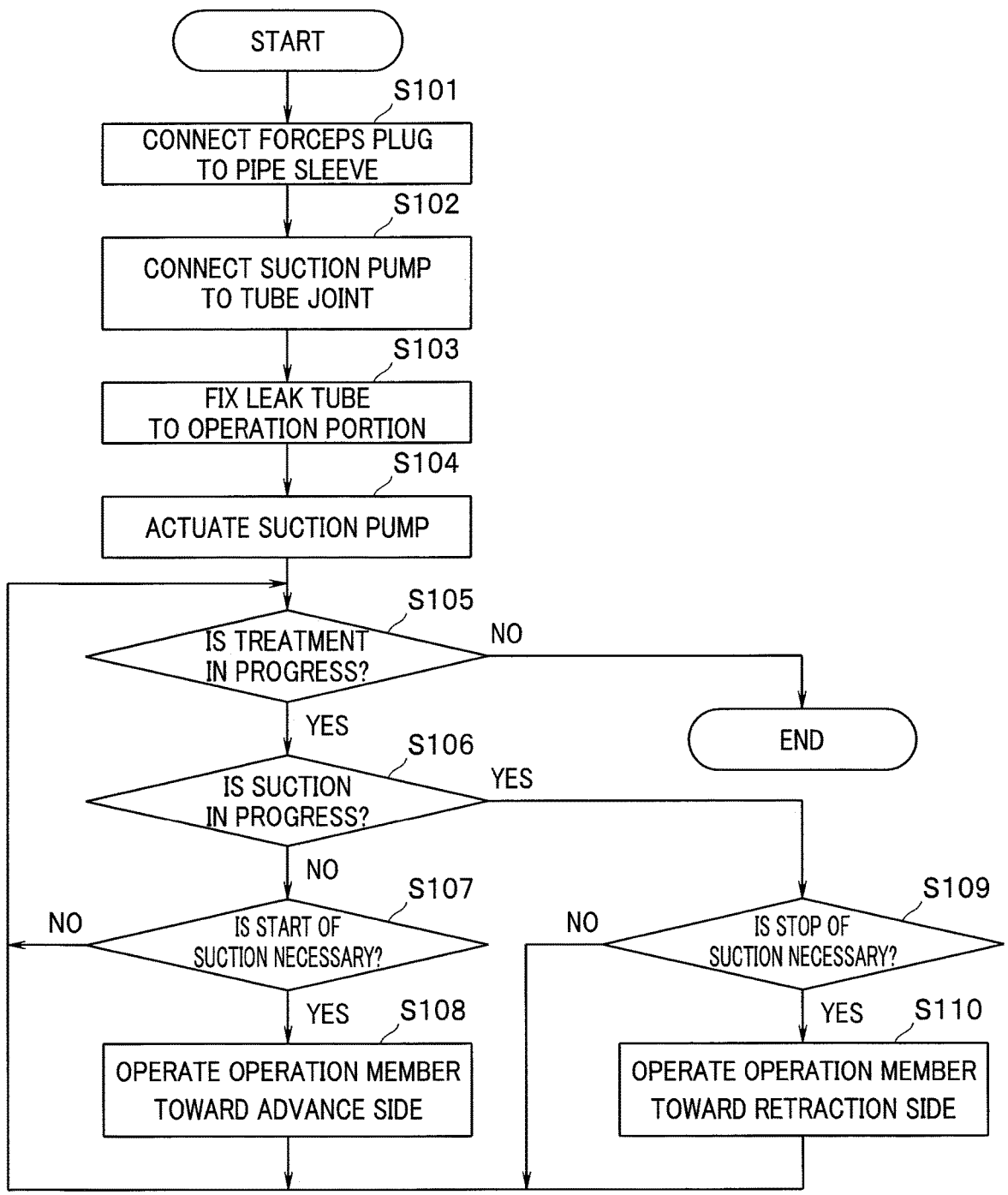
FIG. 9 is a flowchart according to the first embodiment, and shows a method for performing suction by using the suction switching unit.

For example, as shown in FIG. 8, the leak tube body 65 may be fixed to the grasping portion 12a by the belt 54 at a position in the vicinity of the bending operation levers 12c or the like. Such a configuration allows the operator or the like to operate the operation member 71 with the little finger or the like of the hand operating the bending operation levers 12c or the like, without releasing the hand from the bending operation levers 12c or the like. In other words, the operator or the like can directly perform an operation of turning on or off the suction with the hand operating the bending operation levers 12c or the like.

Next, a method for performing suction by the endoscope system 1 that uses the above-mentioned suction switching unit 7 will be described.

The suction using the suction switching unit 7 is performed for treatment in which it is expected that massive bleeding may occur, for example. Alternatively, the suction using the suction switching unit 7 may also be performed in an emergency when massive bleeding or the like occurs during treatment.

In the method for performing suction, first, an operator or the like connects the forceps plug 50 of the suction switching unit 7 to the pipe sleeve 12b of the endoscope 5 (step S101). The operator or the like may insert forceps (treatment instrument 8) into the treatment instrument insertion opening 61a of the forceps plug 50 connected to the pipe sleeve 12b when necessary.

Next, the operator or the like connects the suction pump 6 to the tube joint 51 via the negative pressure introduction tube 62 and the suction tank 6a, for example (step S102).

Then, the operator or the like fixes the leak tube body 65 at any position of the operation portion 12 by using the belt 54.

Thereafter, the operator or the like activates the suction pump 6. With such operations, introduction of a suction negative pressure into the forceps plug 50 from the suction pump 6 is started.

In a state where treatment that uses the endoscope 5 is in progress (step S105: YES), and an object to be suctioned is not being suctioned from the treatment instrument channel 14 (step S106: NO), when it is necessary to start the suction of the object to be suctioned (step S107: YES), the operator or the like operates the operation member 71 toward an advance side with a finger F of the hand operating the bending operation levers 12c or the like.

Therefore, releasing of the suction negative pressure from the respective leak holes 65b to the atmosphere is cut off, so that the suction negative pressure introduced into the forceps plug 50 is introduced into the treatment instrument channel 14. In other words, the object to be suctioned is suctioned by the suction negative pressure introduced into the treatment instrument channel 14.

Further, in a state where the treatment that uses the endoscope 5 is in progress (step S105: YES), and the object to be suctioned is being suctioned from the treatment instrument channel 14 (step S106: YES), when it is necessary to stop the suction of the object to be suctioned (step S109: YES), the operator or the like operates the operation member 71 toward a retraction side with the finger F of the hand operating the bending operation levers 12c.

Therefore, the respective leak holes 65b are open to the atmosphere, so that the suction negative pressure introduced into the forceps plug 50 is released from the leak holes 65b. In other words, the atmosphere is introduced into the leak tube 52 from the leak holes 65b by the suction negative pressure.

Therefore, the suction of the object to be suctioned by the treatment instrument channel 14 is stopped. In other words, the inner diameter of the leak tube 52 is set to be equal to or larger than the inner diameter of the treatment instrument channel 14, and a conduit length of the leak tube 52 is shorter than a conduit length of the treatment instrument channel 14. For this reason, a resistance in a flow passage on a leak tube 52 side is smaller than a resistance in a flow passage on a treatment instrument channel 14 side. Accordingly, a flow passage for a suction negative pressure introduced into the forceps plug 50 is switched from the treatment instrument channel 14 side to the leak tube 52 side, so that the suction of the object to be suctioned by the treatment instrument channel 14 is stopped.

Such an operation of moving the operation member 71 forward or backward can be repeatedly performed when necessary until the treatment that uses the endoscope 5 ends (step S105: NO).

According to such an embodiment, the suction switching unit 7 includes the forceps plug 50, the tube joint 51, and the leak tube 52, the forceps plug 50 being removably connected to the pipe sleeve 12b provided between the grasping portion 12a and the insertion portion 11 of the endoscope 5, the tube joint 51 having one end side connected to the forceps plug 50 and having the other end side connected to the suction pump 6, the leak tube 52 having one end side connected to the forceps plug 50 and having the other end side having the leak holes 65b open to an external space. With such a configuration, it is possible to exhibit good performance of suctioning an object to be suctioned while good operability of the endoscope 5 is ensured.

In other words, the suction switching unit 7 allows the suction pump 6 to be connected to the treatment instrument channel 14 at a position exterior to the operation portion 12 without via the first suction tube 15, which is provided in the operation portion 12, or the second suction tube 27, which is provided in the universal cable 13, for example. With such a configuration, it is possible to increase the inner diameter of the conduit ranging from the suction pump 6 to the treatment instrument channel 14 without difficulty. Accordingly, it is possible to exhibit good performance of suctioning an object to be suctioned.

The leak tube 52 of the suction switching unit 7 is branched from a series of conduits ranging from the suction pump 6 to the treatment instrument channel 14. Further, the suction of an object to be suctioned performed by using the leak tube 52 is switched by the slider 53, which is independent from the suction piston 29 provided in the operation portion 12. With such a configuration, it is possible to dispose the leak tube 52 of the suction switching unit 7 at any position that can avoid interference with the bending operation lever 12c or the like provided on the operation portion 12. Accordingly, it is possible to ensure good operability of the endoscope 5.

In this case, the suction switching unit 7 also includes the belt 54 for fixing the leak tube 52 at any position closer to the grasping portion 12a than the pipe sleeve 12b. With such a configuration, it is possible to fix the leak tube 52 at any position that matches a size or the like of the hand of the operator or the like while interference with the bending operation lever 12c or the like is avoided. Accordingly, it is possible to further increase operability of an operation member 71 of the suction switching unit 7. A fixed position may be a position that allows the operator or the like that grips the grasping portion 12a of the operation portion 12 to operate the slider 53 with the thumb, the ring finger, the little finger, or the like of the hand of the operator, for example.

The relay tube 66 of the leak tube 52 is made of a resin material having flexibility. With such a configuration, the relay tube 66 can be bent in any direction and hence, it is possible to further increase the degree of freedom in a position at which the leak tube 52 is attached to the operation portion 12.

The forceps plug 50 has the treatment instrument insertion opening 61a at a position that faces the pipe sleeve 12b. With such a configuration, also in a state where the suction switching unit 7 is mounted, it is possible to perform various treatments that uses the treatment instrument 8.

An opening for releasing the leak tube 52 to the atmosphere is formed of the plurality of leak holes 65b provided in the side portion of the leak tube body 65. A hole diameter of each leak hole 65b is set to a hole diameter that prevents liquid from passing through the leak hole 65b. With such a configuration, for example, when the treatment instrument 8 is inserted into the treatment instrument channel 14 from the treatment instrument insertion opening 61a, or when liquid is injected into the treatment instrument channel 14 from the treatment instrument insertion opening 61a by using a syringe or the like, it is possible to prevent liquid remaining in the conduit in the leak tube 52 or the like from ejecting from each leak hole 65b.

The slider 53 may have a color or a mark (printed letter or the like) at a portion that is exposed via the respective leak holes 65b when the slider 53 is at the advanced position, and that is exposed via the key hole 65c when the slider 53 is at the retraction position, for example. With such a configuration, it is possible to visually confirm an open/closed state of the leak holes 65b due to the slider 53.

In the present embodiment, for example, the above-mentioned suction switching unit 7 may have a configuration where the leak tube 52 can extend and contract in an axial direction (a direction of a longitudinal axis) of the leak tube 52.

Figure 10:
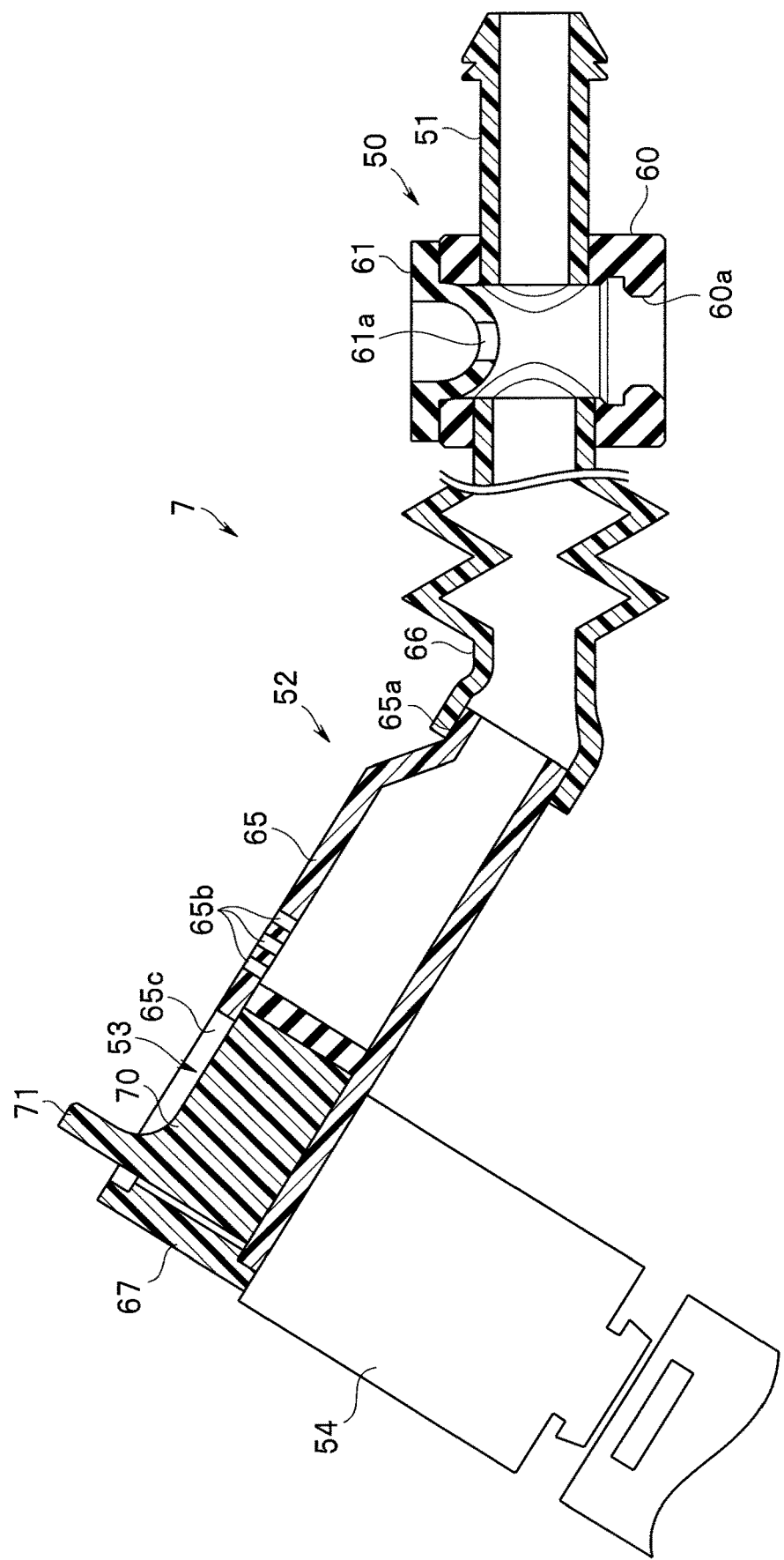
FIG. 10 is a cross-sectional view according to a first modification of the first embodiment, and shows a main portion of a suction switching unit.

Such a configuration can be achieved by forming at least a portion of the relay tube 66 into a bellows shape as shown in FIG. 10, for example. At least a portion of the second tube 66 is extendable and contractable in an axial direction of the second tube 66.

Figure 11:
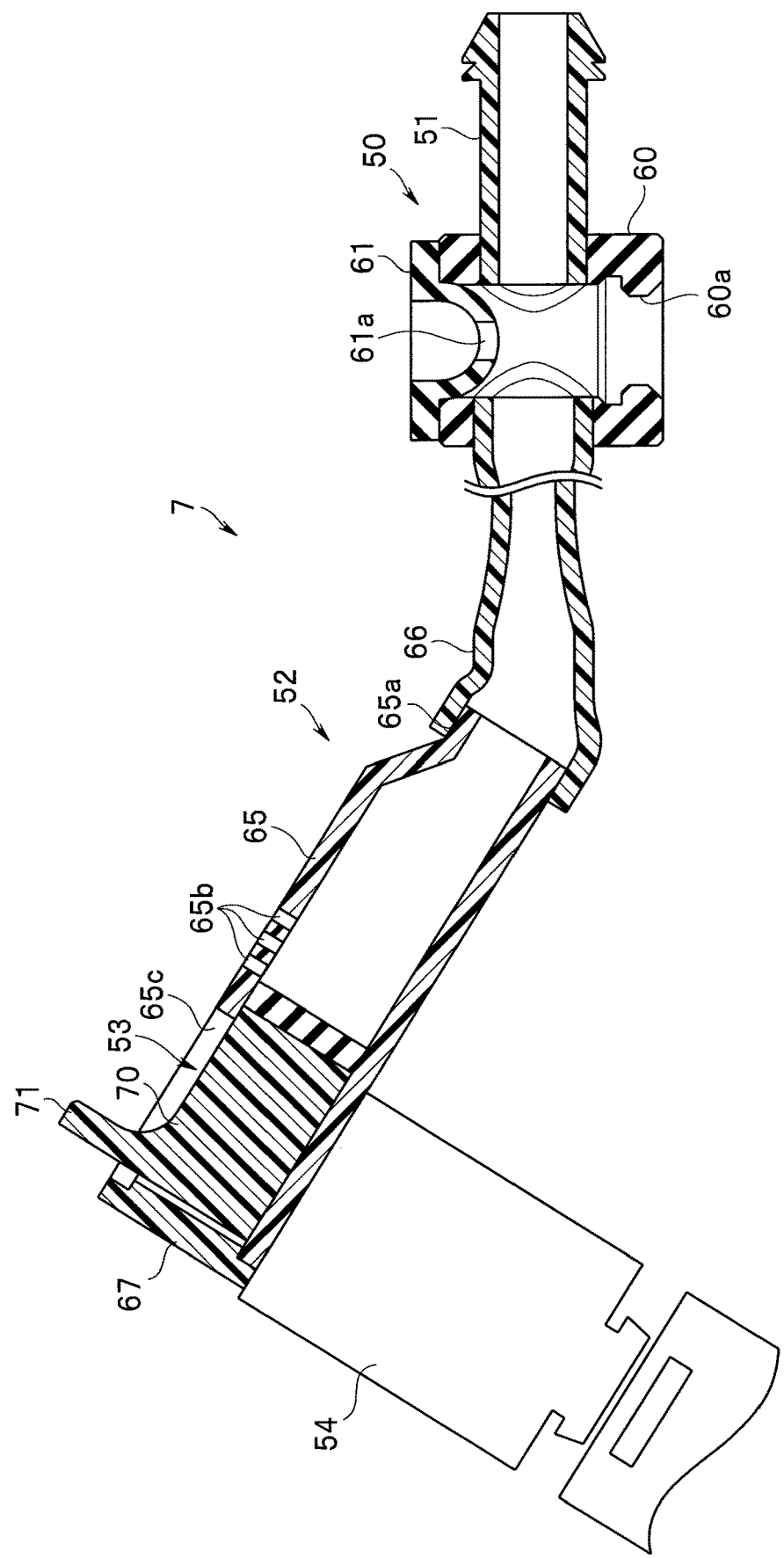
FIG. 11 is a cross-sectional view according to a second modification of the first embodiment, and shows a main portion of a suction switching unit.

Alternatively, such a configuration can be achieved by forming the relay tube 66 itself by using a resin material that can extend and contract in the axial direction (the direction of the longitudinal axis) as shown in FIG. 11, for example.

Such configurations can further increase the degree of freedom in arrangement of the leak tube 52 on the operation portion 12.

Figure 12:
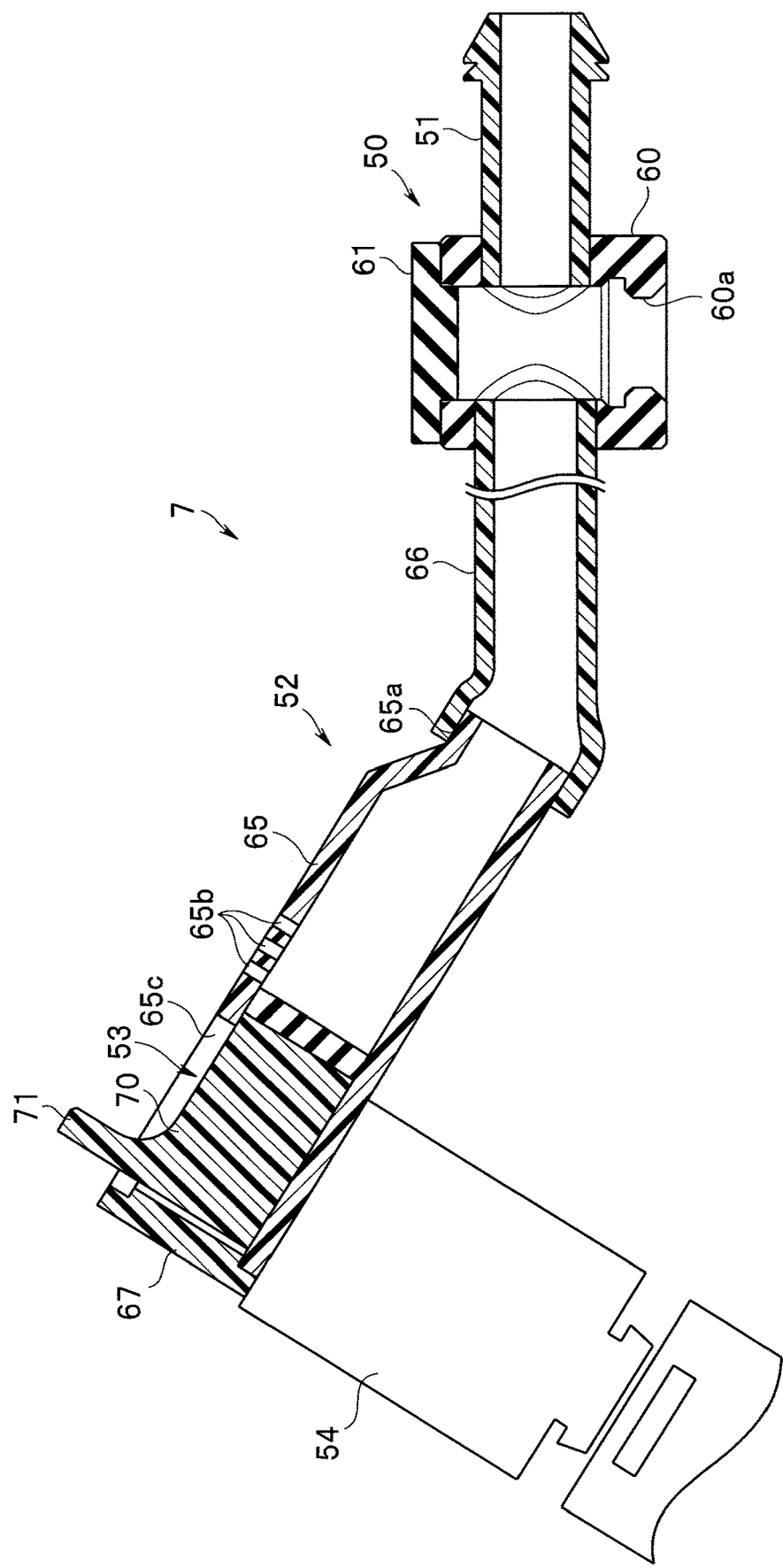
FIG. 12 is a cross-sectional view according to a third modification of the first embodiment, and shows a main portion of a suction switching unit.

In a case where the suction switching unit 7 is caused to specialize in suction of the object to be suctioned, as shown in FIG. 12, for example, it is also possible to adopt a configuration where the treatment instrument insertion opening provided in the closing member 61 is omitted.

Next, a second embodiment of the present disclosure will be described with reference to FIGS. 13 and 14. The above-mentioned first embodiment shows the configuration where the packing 72 is formed as a separate body from the slider body 70. In contrast, the present embodiment shows a configuration where the packing 72 is integrally formed with the slider body 70. Components substantially the same as the corresponding components in the above-mentioned first embodiment are given the same reference symbols, and repeated description will be omitted when appropriate.

A slider 53 of the present embodiment is made of a rubber material or the like having elasticity. In the slider 53, the packing 72 protrudes from a surface of the slider body 70 on one end side in the axial direction (the direction of the longitudinal axis) of the leak tube body 65. More specifically, the packing 72 protrudes from the slider body 70 at a position where the packing 72 is slidable at least with the leak holes 65b out of an inner peripheral surface of the leak tube body 65.

Figure 13:
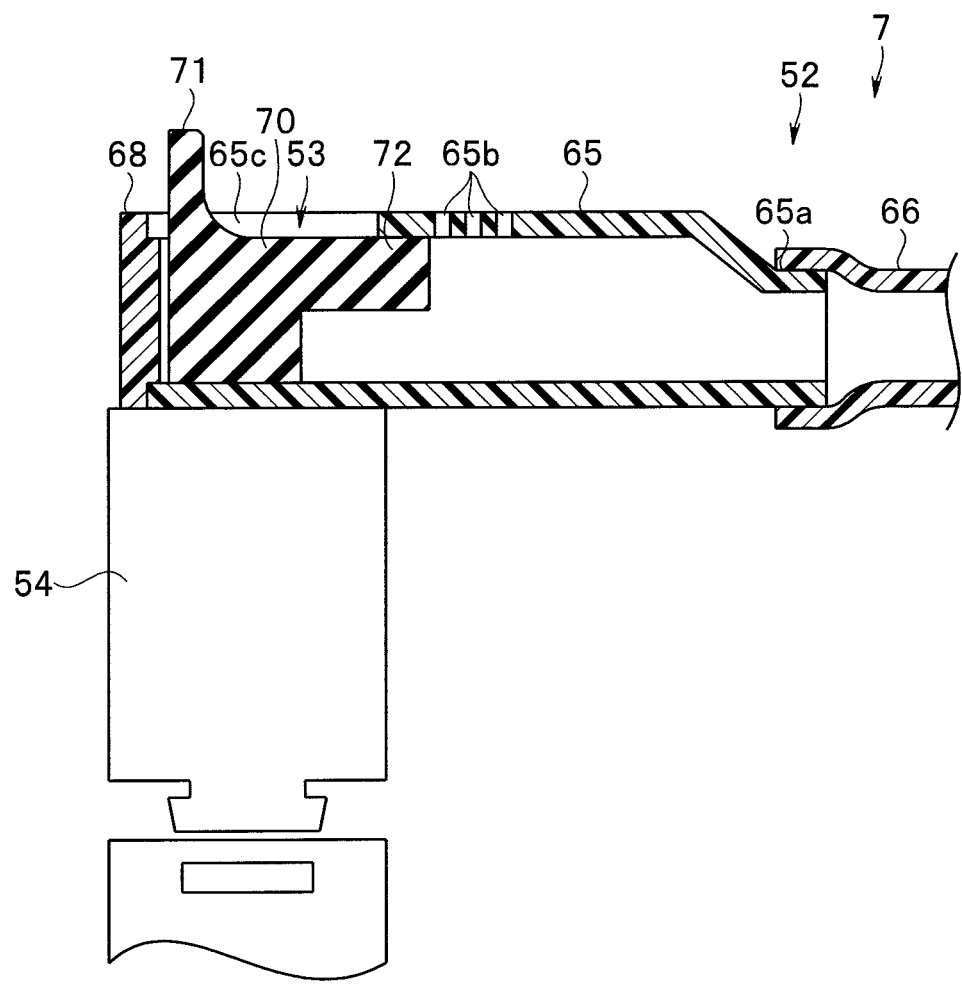
FIG. 13 is a cross-sectional view according to a second embodiment, and shows a main portion of a suction switching unit when suction is in an off state.
Figure 14:
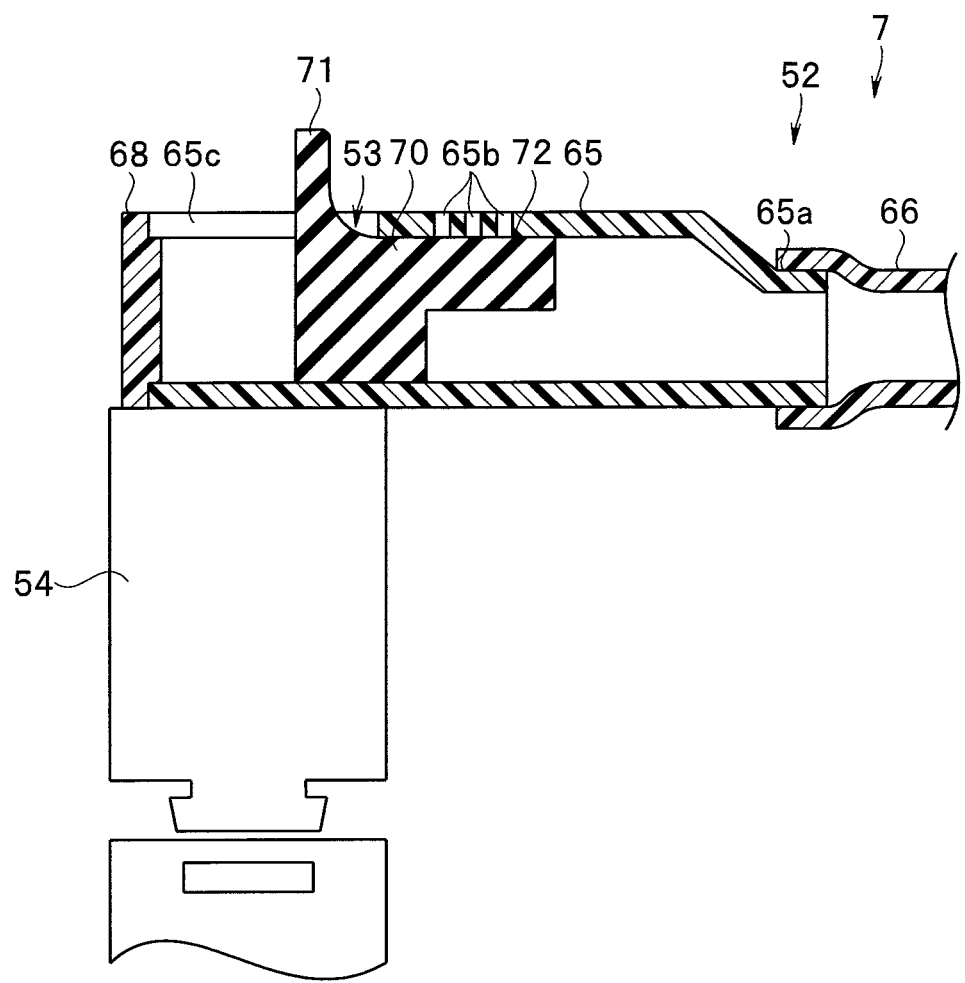
FIG. 14 is a cross-sectional view according to the second embodiment, and shows the main portion of the suction switching unit when suction is in an on state.

A length of the packing 72 is set to a length that allows the packing 72 to retract to a position closer to the other end side than the respective leak holes 65b when the slider 53 is located on the other end side (see FIG. 13). The length of the packing 72 is also set to a length that allows the packing 72 to overlap with the respective leak holes 65b when the slider 53 is located on one end side.

In such a configuration, when the slider 53 is at the retraction position, the packing 72 allows the respective leak holes 65b to be released to the atmosphere. Therefore, suction of an object to be suctioned by the treatment instrument channel 14 is turned off.

In contrast, when the slider 53 is at the advanced position, the packing 72 closes the respective leak holes 65b. Therefore, the suction of the object to be suctioned by the treatment instrument channel 14 is turned on.

According to such an embodiment, it is possible to obtain an advantageous effect substantially the same as the advantageous effect of the above-mentioned first embodiment.

Figure 15:
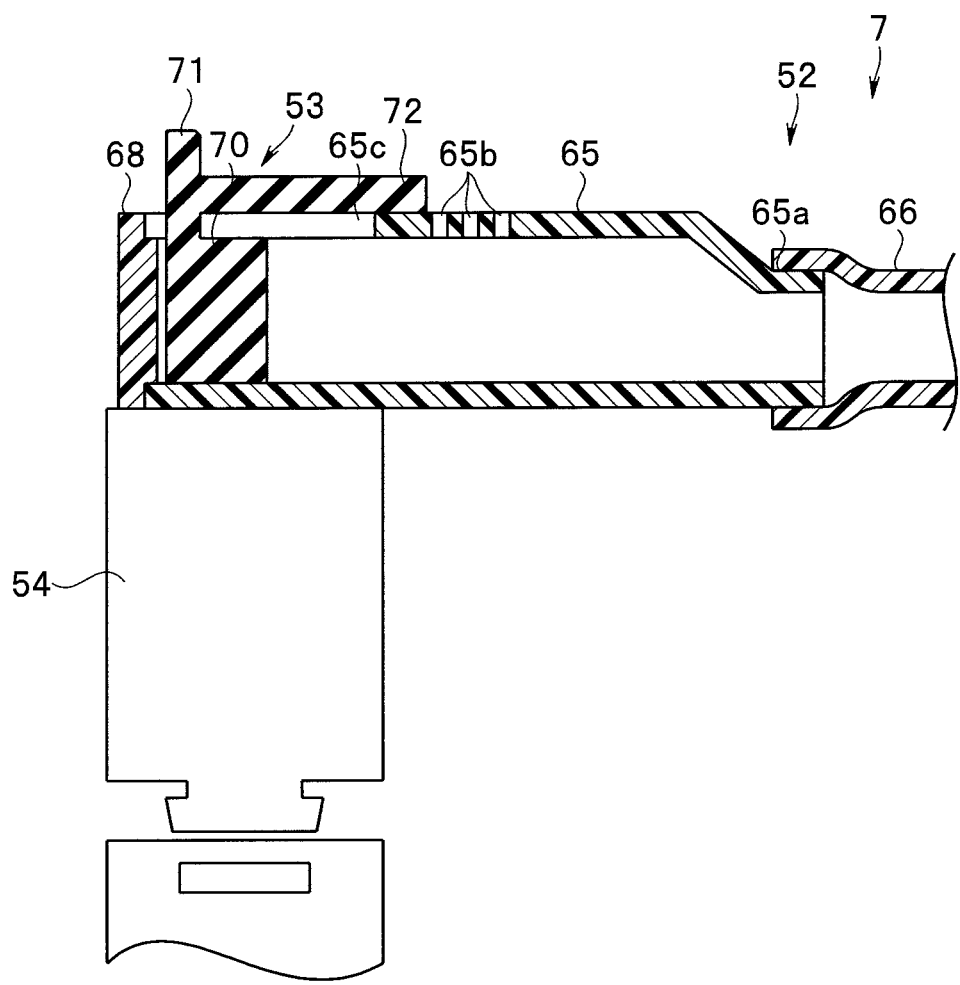
FIG. 15 is a cross-sectional view according to a first modification of the second embodiment, and shows a main portion of a suction switching unit when suction is in an off state.
Figure 16:
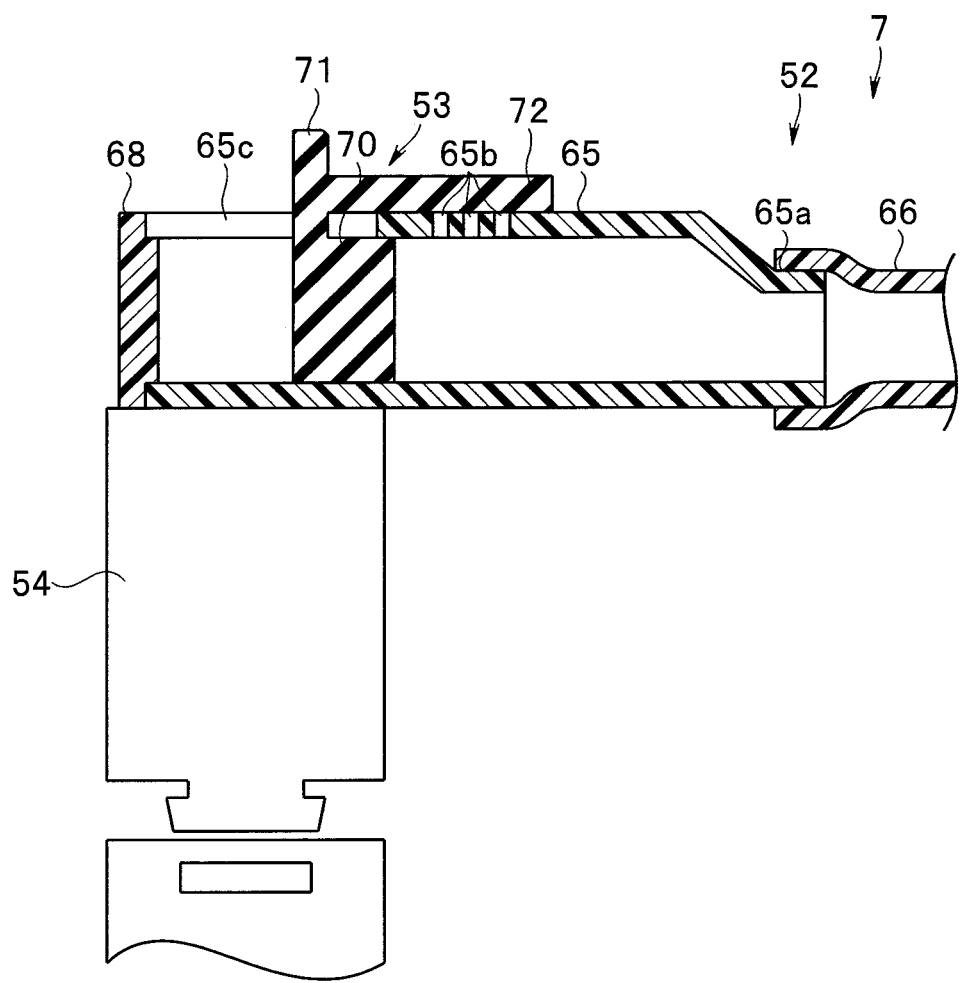
FIG. 16 is a cross-sectional view according to the first modification of the second embodiment, and shows the main portion of the suction switching unit when suction is in an on state.

As shown in FIGS. 15 and 16, for example, it is also possible to adopt a configuration where the packing 72 is caused to protrude from the operation member 71 to dispose the packing 72 on an outer periphery side of the leak tube body 65. With such a configuration, it becomes unnecessary to close the inside of the entire leak tube body 65 with the packing 72 and hence, it is possible to reduce slide resistance of the slider 53. In addition to the above, it is also possible to easily visually confirm an open/closed state of the leak holes 65b. In the second position, the seal 72 contacts the second opening on an outer surface of the body of the pressure regulator.

Figure 17:
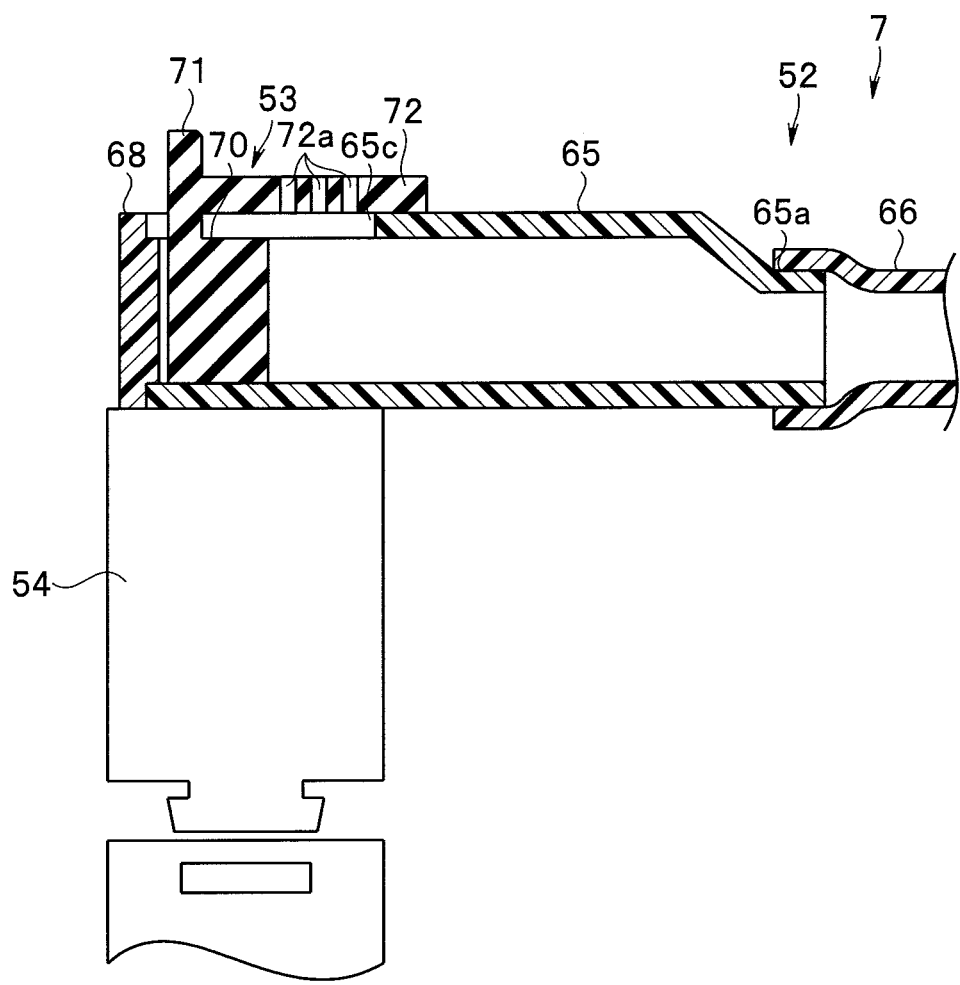
FIG. 17 is a cross-sectional view according to a second modification of the second embodiment, and shows a main portion of a suction switching unit when suction is in an off state.
Figure 18:
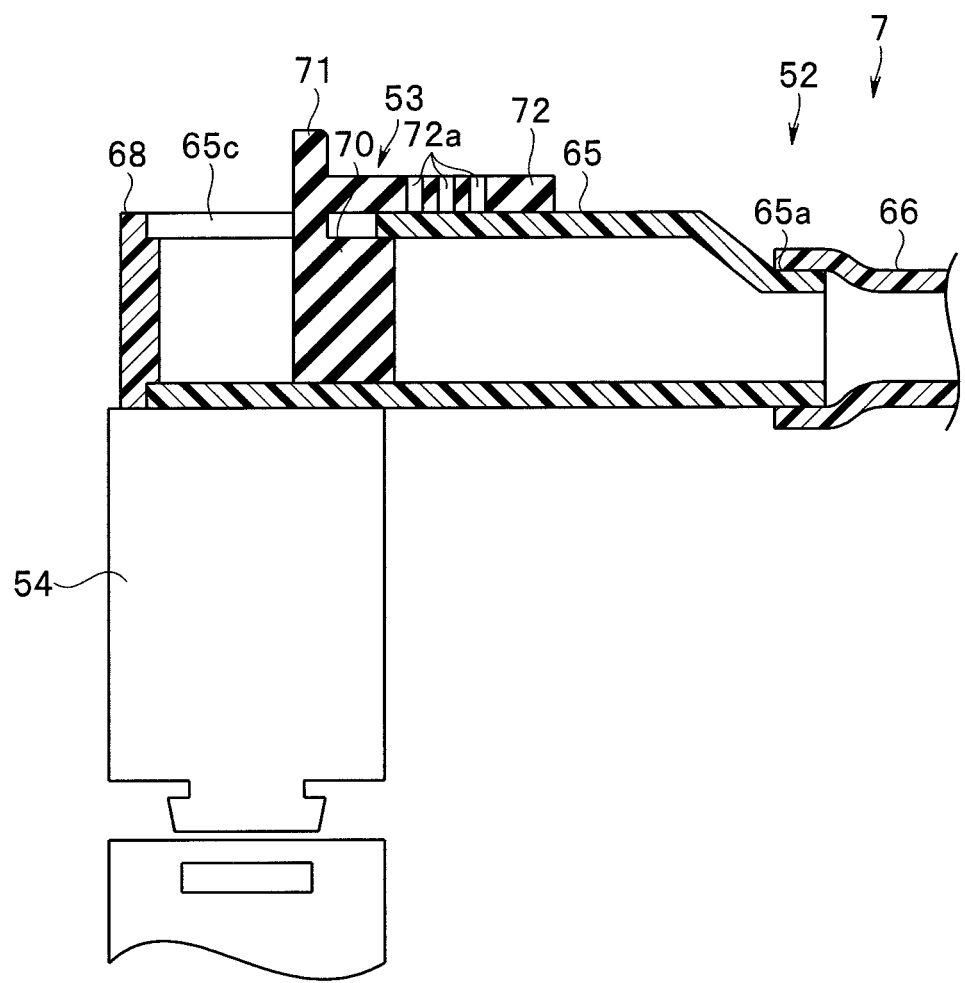
FIG. 18 is a cross-sectional view according to the second modification of the second embodiment, and shows the main portion of the suction switching unit when suction is in an on state.

It is also possible to cause the key hole 65c to additionally have a function as an opening (hole) that releases a suction negative pressure to the atmosphere as shown in FIGS. 17 and 18, for example. In this case, by providing leak holes 72a, being other holes, to the packing 72, it is possible to obtain an advantageous effect the same as the advantageous effect of the above-mentioned embodiment.

In other words, as shown in FIG. 17, for example, when the slider 53 is at the retraction position, a position of a first leak hole 65e in the direction of the longitudinal axis of the leak tube 52 is aligned with positions of second leak holes 72c in the direction of the longitudinal axis of the leak tube 52. Therefore, the first leak hole 65c is opened, so that suction performed by the treatment instrument channel 14 is turned off. The actuator 53 includes the fourth opening 65c, in the first position, the fourth opening 65c is in fluid communication with the second opening 72a, and when the actuator 53 is in the second position, the fourth opening 65c is not in fluid communication with the second opening 72a.

In contrast, as shown in FIG. 18, for example, when the slider 53 is at the advanced position, the position of the first leak hole 65c in the direction of the longitudinal axis of the leak tube 52 is not aligned with the positions of the second leak holes 72c in the direction of the longitudinal axis of the leak tube 52. Therefore, the first leak hole 65c is closed by the packing 72, so that the suction performed by the treatment instrument channel 14 is turned on.

Figure 19:
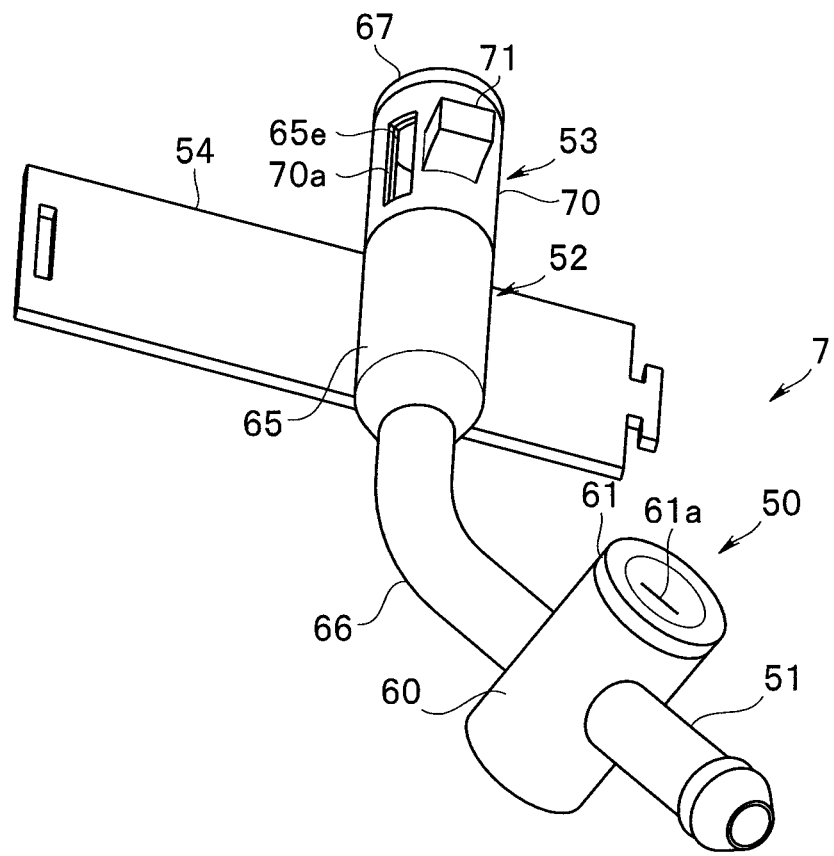
FIG. 19 is a perspective view according to a third modification of the second embodiment, and shows a suction switching unit when suction is in an off state.
Figure 20:
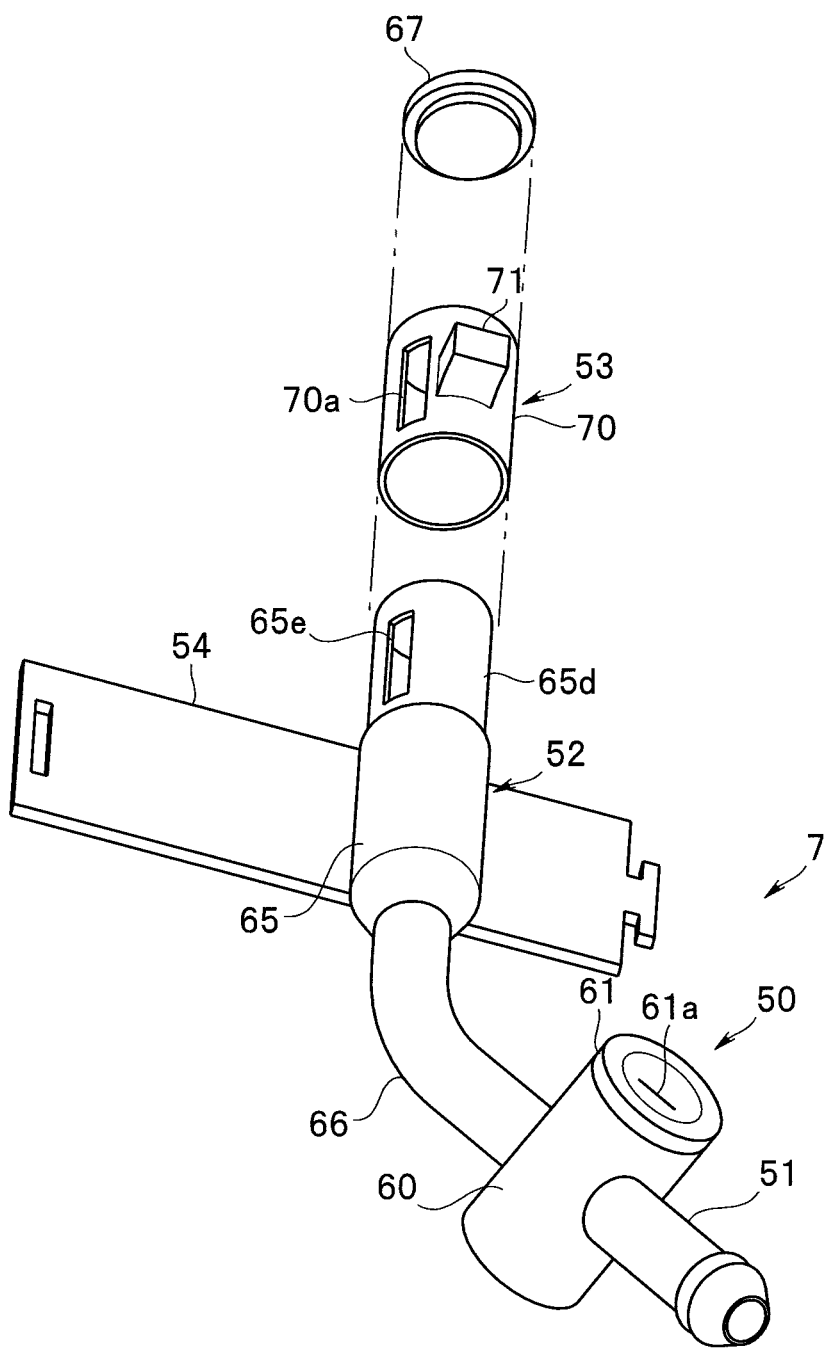
FIG. 20 is an exploded perspective view according to the third modification of the second embodiment, and shows the suction switching unit.
Figure 21:
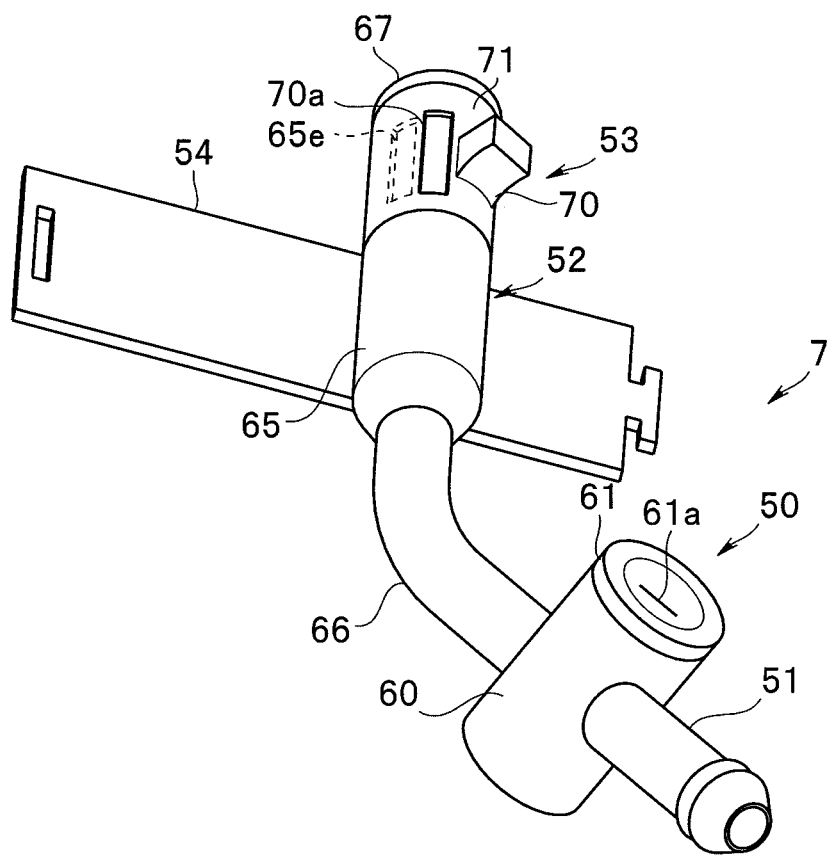
FIG. 21 is a perspective view according to the third modification of the second embodiment, and shows the suction switching unit when suction is in an on state.

As shown in FIG. 19 to FIG. 21, for example, it is also possible to adopt a configuration where the slider 53 can be turned about an axis (about a longitudinal axis) of the leak tube body 65.

When a specific description is made, a slide portion 65d having a cylindrical shape is provided on the other end side of a leak tube body 65 of the present modification. An outer diameter of the slide portion 65d is set to be relatively smaller than an outer diameter of the leak tube body 65 on one end side. The slide portion 65d has a first leak hole 65e being an opening for making an internal space of the slide portion 65d communicate with an external space. In the present modification, the first leak hole 65e is a single hole. However, a plurality of first leak holes 65e may be provided.

The slider 53 of the present modification includes the slider body 70 having a cylindrical shape. The slider body 70 is slidably fitted on an outer periphery of the slide portion 65d. Therefore, the slider body 70 also has a function as a sealing member (packing) that closes the first leak hole 65e.

The slider body 70 has a second leak hole 70a. The second leak hole 70a has an opening shape substantially the same as the opening shape of the first leak hole 65e. The second leak hole 70a is provided at a position that is aligned with the first leak hole 65e in an axial direction (a direction of a longitudinal axis) of the slider body 70.

The slider body 70 is provided with the operation member 71 formed of a protrusion that protrudes outward in the radial direction of the slider body 70. The operation member 71 is provided at a position adjacent to the second leak hole 70a, for example. The operator or the like can turn the slider body 70 about an axis of the leak tube body 65 by operating the operation member 71.

When the slider body 70 is at a turning position at which the second leak hole 70a is caused to overlap with the first leak hole 65e, the first leak hole 65e is opened (see FIG. 19). Therefore, suction of an object to be suctioned by the treatment instrument channel 14 is turned off. The actuator 53 includes the fourth opening 70a, in the first position, the fourth opening 70a is in fluid communication with the second opening 65e, and when the actuator 53 is in the second position, the fourth opening 70a is not in fluid communication with the second opening 65e. The actuator 53 may be movable between the first position and the second position by rotation about a longitudinal axis of the interior cavity.

In contrast, when the slider body 70 is at a turning position at which the second leak hole 70a is prevented from overlapping with the first leak hole 65e, the first leak hole 65e is closed (see FIG. 21). Therefore, suction of the object to be suctioned by the treatment instrument channel 14 is turned on.

Figure 22:
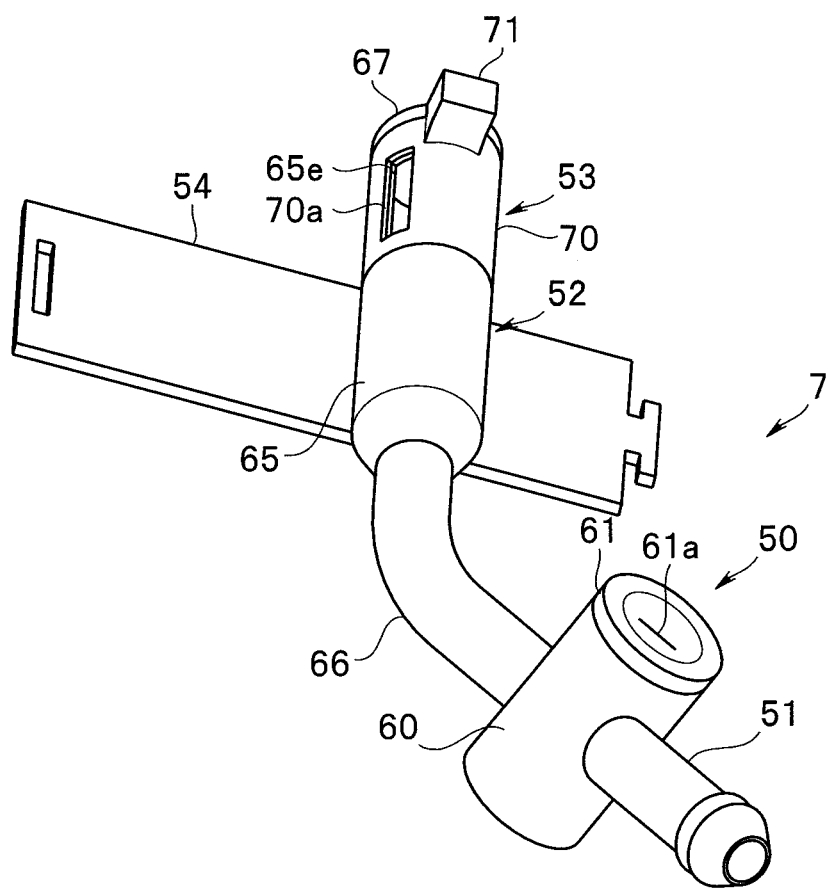
FIG. 22 is a perspective view according to a fourth modification of the second embodiment, and shows a suction switching unit.
Figure 23:
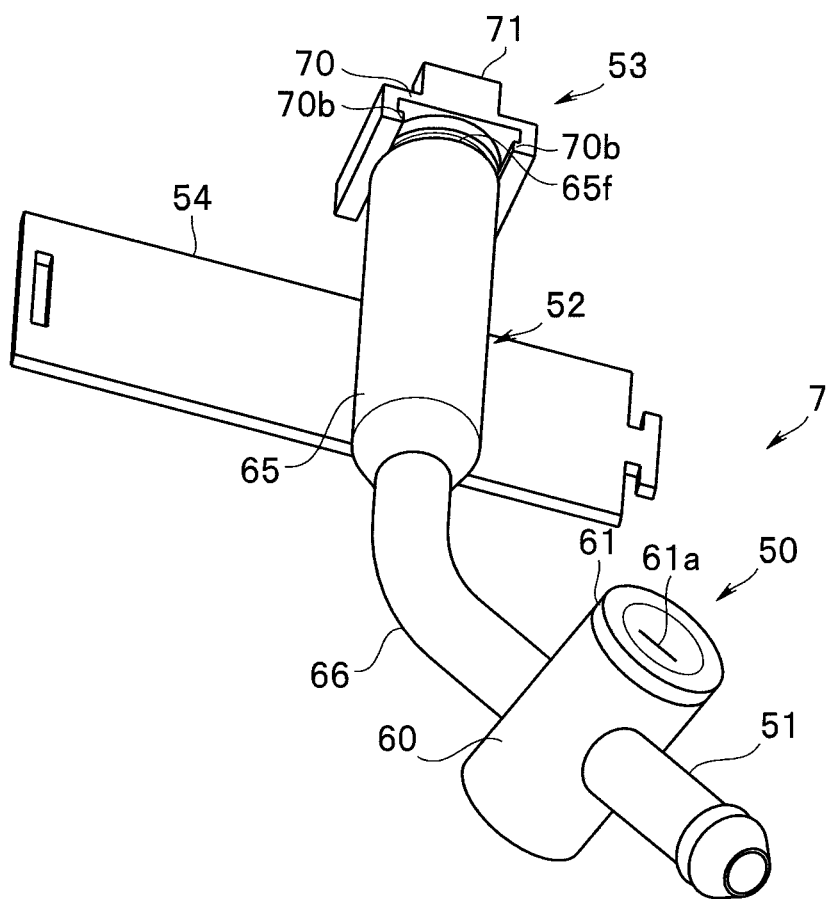
FIG. 23 is a perspective view according to a third embodiment, and shows a suction switching unit.
Figure 24:
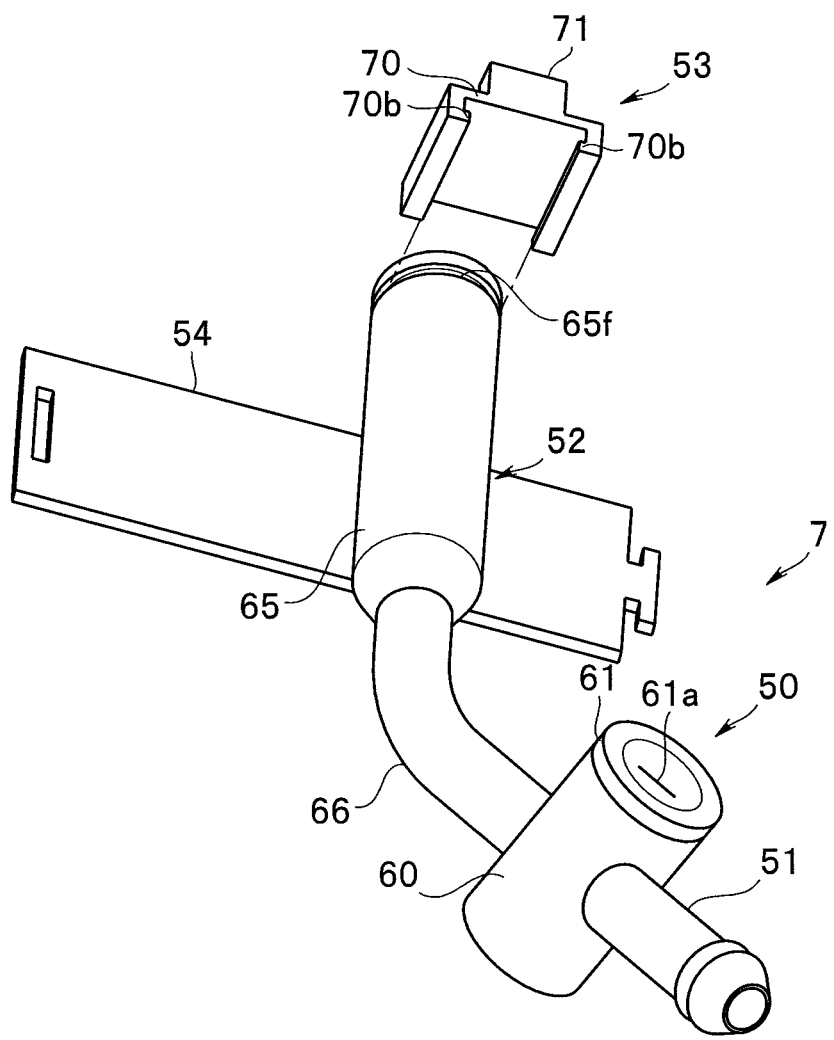
FIG. 24 is an exploded perspective view according to the third embodiment, and shows the suction switching unit.
Figure 25:
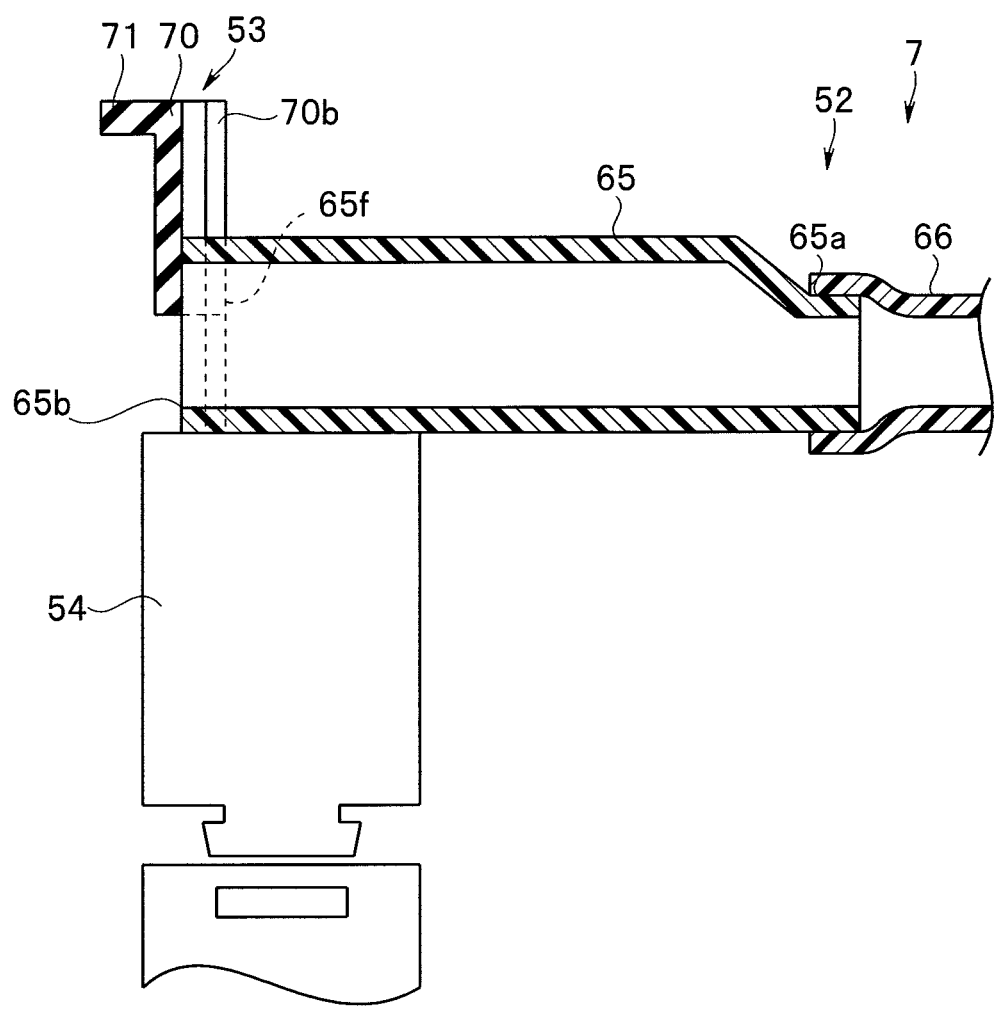
FIG. 25 is a cross-sectional view according to the third embodiment, and shows a main portion of the suction switching unit when suction is in an off state.

With such a configuration, by adopting a configuration where the slider body 70 is caused to turn about the longitudinal axis of the leak tube body 65, an increase in operability for an operator or the like having small hands, for example, can be more expected compared with the configuration where the slider body 70 is operated in the axial direction. As shown in FIG. 22, for example, the operation member 71 may be provided on the other end side of the slider 53 (the slider body 70). With such a configuration, it is possible to dispose the operation member 71 at a position in the vicinity of the hand of the operator or the like operating the bending operation levers 12c or the like.

Next, a third embodiment of the present disclosure will be described with reference to FIG. 23 to FIG. 26. The above-mentioned first embodiment shows the configuration where the slider 53 is moved in the axial direction of the leak tube body 65. In contrast, the present embodiment shows a configuration where the slider 53 is moved in a direction intersecting with the axis of the leak tube body 65. Components substantially the same as the corresponding components in the above-mentioned first embodiment are given the same reference symbols, and repeated description will be omitted when appropriate.

An open end of the leak tube body 65 of the present embodiment on the other end side is directly set as a leak hole 65b, being an opening. A guide groove 65f is provided in an outer peripheral portion of the leak tube body 65 at a position in the vicinity of the leak hole 65b, the guide groove 65f extending in a direction intersecting with the longitudinal axis of the leak tube body 65.

The slider 53 of the present embodiment also includes a slider body 70 having a flat plate shape, for example. A pair of keys 70b is provided on one end surface side of the slider body 70, the pair of keys 70b being engageable with the guide groove 65f. The keys 70b are straight ridges that face each other. The keys 70b engage with the guide groove 65f, so that the slider 53 is slidably supported on the leak tube body 65.

Further, an operation member 71 having a protrusion shape is provided on the other end surface side of the slider body 70. The operator or the like can move the slider body 70 in a direction intersecting with the longitudinal axis of the leak tube body 65 by operating the operation member 71.

Figure 26:
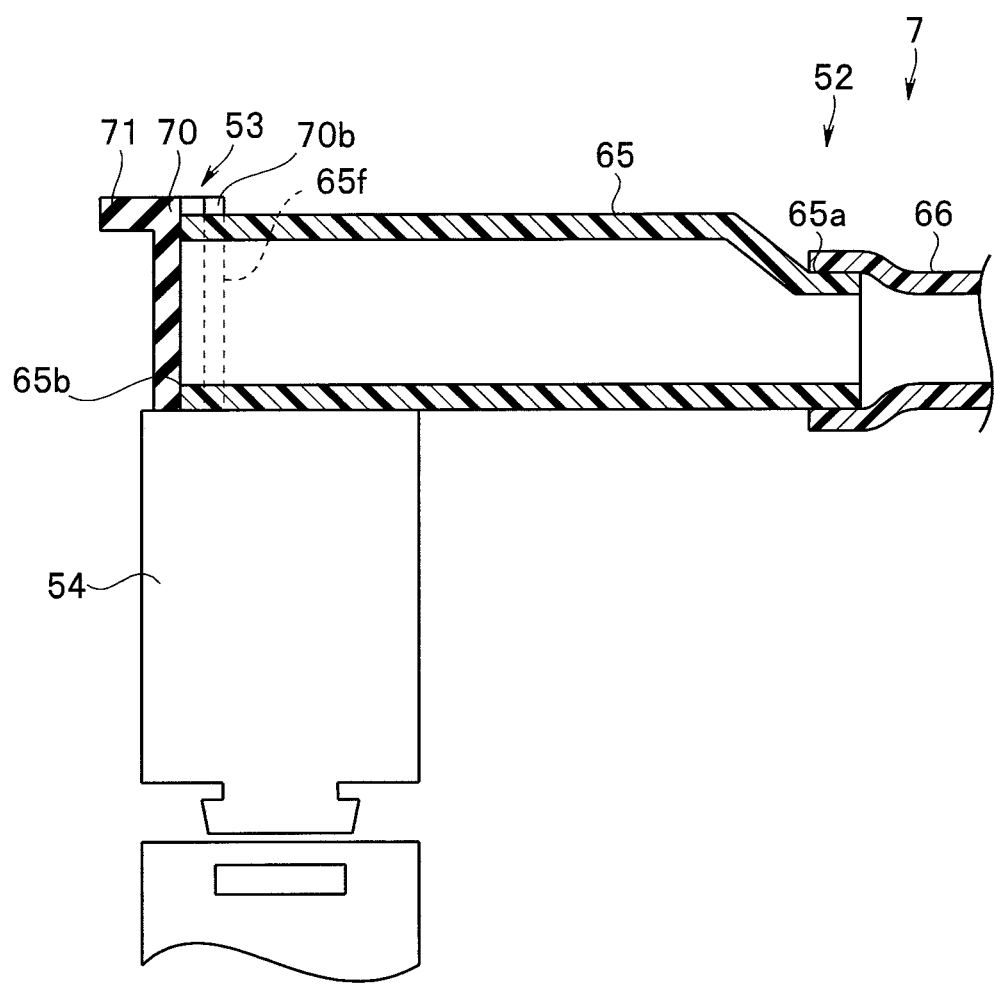
FIG. 26 is a cross-sectional view according to the third embodiment, and shows the main portion of the suction switching unit when suction is in an on state.

In other words, the slider body 70 (the slider 53) can move between a position where the slider body 70 opens the leak hole 65b (see FIG. 25) and a position where the slider body 70 closes the leak hole 65b (see FIG. 26).

When the leak hole 65b is opened by the slider 53, suction of an object to be suctioned by the treatment instrument channel 14 is turned off.

In contrast, when the leak hole 65b is closed by the slider 53, suction of the object to be suctioned by the treatment instrument channel 14 is turned on.

According to such an embodiment, in addition to the advantageous effects that can be obtained by the above-mentioned respective embodiments, it is possible to obtain an advantageous effect that the configuration of the suction switching unit 7 can be further simplified.

The present disclosure is not limited to the above-described respective embodiments, and various modifications and changes are conceivable. Embodiments to which such modifications or changes are applied also fall within the technical scope of the present disclosure. For example, the position of the leak hole 65b as the opening provided in the leak tube body 65 is not limited to the positions in the above-mentioned respective embodiments, and the leak hole 65b may be provided at various positions of the leak tube body 65 according to the specifications of the suction switching unit 7. The configurations of the above-mentioned respective embodiments and respective modifications may be suitably combined.

Example 1. An attachment comprising:
a connection member removably connected to a pipe sleeve that communicates with a suction conduit provided in an endoscope, and that is provided between a grasping portion and an insertion portion of the endoscope;
a first tubular member communicating with the connection member at one end side, and being connectable to a suction device at another end side;
a second tubular member communicating with the connection member at one end side, and including an opening that is open to an external space; and
an opening/closing member configured to open and close the opening of the second tubular member.

Example 2. The attachment according to Example 1, further comprising a fixing member configured to fix the second tubular member to the endoscope at a position closer to the grasping portion than the pipe sleeve.

Example 3. The attachment according to Example 1, wherein
the second tubular member is made of a resin material.

Example 4. The attachment according to Example 1, wherein
the connection member further includes a treatment instrument insertion opening that allows insertion of a treatment instrument.

Example 5. The attachment according to Example 1, wherein
at least a portion of an intermediate portion of the second tubular member is extendable and contractable in an axial direction of the second tubular member.

Example 6. The attachment according to Example 1, wherein
the opening comprises at least one hole provided in a side portion of the second tubular member, and
the opening/closing member is a slider that is provided in a slidable manner with respect to the second tubular member, the slider closing the at least one hole or a portion of a conduit located at a position closer to the connection member than the at least one hole in a case where the slider is moved by sliding to a predetermined position with respect to the second tubular member.

Example 7. The attachment according to Example 6, wherein
the at least one hole has a size that allows gas to pass through the at least one hole and that prevents liquid from passing through the at least one hole.

Example 8. The attachment according to Example 6, wherein
the at least one hole comprises a plurality of holes provided in the side portion of the second tubular member.

Example 9. The attachment according to Example 6, wherein
the slider includes a sealing member configured to close an inside of the second tubular member,
the slider is slidable in a direction of a longitudinal axis of the second tubular member, and
in the case where the slider is moved to the predetermined position, the sealing member closes the inside of the second tubular member at the position closer to the connection member than the at least one hole.

Example 10. The attachment according to Example 9, wherein
the sealing member is provided at an end portion of the slider on a side close to the connection member.

Example 11. The attachment according to Example 6, wherein
the slider includes a sealing member that closes the at least one hole in the case where the slider is moved to the predetermined position.

Example 12. The attachment according to Example 11, wherein
the sealing member is disposed along a side surface of the second conduit member.

Example 13. The attachment according to Example 11, wherein
the slider is slidable in a direction of a longitudinal axis of the second conduit member.

Example 14. The attachment according to Example 11, wherein
the sealing member includes another hole that opens the at least one hole in the case where the slider is moved to the predetermined position.

Example 15. The attachment according to Example 11, wherein
the slider is slidable about a longitudinal axis of the second tubular member.

Example 16. The attachment according to Example 15, wherein
the slider is disposed on an outer peripheral surface of the second tubular member, and includes a protrusion for allowing a sliding operation.

Example 17. The attachment according to Example 1, wherein
the opening is provided in another end of the second tubular member, and
the opening/closing member is a slider that is provided at the other end of the second tubular member, and that is provided in a slidable manner with respect to the second tubular member.

Example 18. An endoscope system comprising:
an endoscope including a suction conduit and a pipe sleeve, the suction conduit being provided in an insertion portion, the pipe sleeve being provided between the insertion portion and a grasping portion and communicating with the suction conduit; and
an attachment including a connection member, a first tubular member, a second tubular member, and an opening/closing member, the connection member being removably connected to the pipe sleeve, the first tubular member communicating with the connection member at one end side and being connectable to a suction device at another end side, the second tubular member communicating with the connection member at one end side and including an opening that is open to an external space, the opening/closing member being configured to open and close the opening of the second tubular member.

Example 19. A method for performing suction by an endoscope that uses an attachment removably mounted on a pipe sleeve communicating with a suction conduit provided in the endoscope, the method comprising:
connecting a connection member of the attachment to the pipe sleeve of the endoscope;
connecting a first tubular member to a suction device, the first tubular member being continuously provided to the connection member;
fixing a second tubular member to a grasping portion of the endoscope, the second tubular member being continuously provided to the connection member;

starting suction performed by the suction device; and
starting suction of an object to be suctioned into the first tubular member from the suction conduit by closing an opening by an opening/closing member provided in the second tubular member, the opening making a conduit in the second tubular member communicate with an external space, or by closing a portion of the conduit located at a position closer to the connection member than the opening by the opening/closing member.

Example 20. The method for performing suction by an endoscope according to Example 19, further comprising
stopping the suction of the object to be suctioned into the first tubular member from the suction conduit by releasing closure of the opening that is performed by the opening/closing member, or by releasing, by the opening/closing member, the portion of the conduit located at the position closer to the connection member than the opening.

What is claimed is:

1. A suction attachment, comprising:
a plug including a plug conduit;
a first tube including a first conduit, wherein the first tube has:
    a first end portion directly or indirectly connected to a suction pump, and
    a second end portion connected to the plug with the first conduit in fluid communication with the plug conduit;
a second tube including a second conduit, wherein the second tube has:
    a third end portion, and
    a fourth end portion connected to the plug with the second conduit in fluid communication with the plug conduit; and
a pressure regulator body connected to the fourth end portion of the second tube, wherein the pressure regulator body has:
    a first opening,
    a second opening,
    an interior cavity in fluid communication with second conduit via the first opening, and in fluid communication with the atmosphere via the second opening, and
    an actuator
movable between a first position and a second position,
wherein, when the actuator is in the first position, the second opening is open,
wherein, when the actuator is in the second position, the second opening is closed and the suction attachment is configured to have a suction flow path through the plug conduit to the first conduit.

2. The suction attachment according to claim 1, wherein the plug further includes a plug cavity and a third opening in fluid communication with the plug cavity and configured to attach to a treatment instrument insertion opening of an endoscope,
wherein a flow path from the second opening, through the interior cavity, the second conduit and the plug conduit, to the first conduit is a first flow path,
wherein a flow path from the third opening, through the plug conduit, to the first conduit is a second flow path,
wherein, in operation with the actuator in the first position, a flow rate of the first flow path is greater than a flow rate of the second flow path, and
wherein, in operation with the actuator in the second position, the flow rate of the first flow path is less than the flow rate of the second flow path.

3. The suction attachment according to claim 2, wherein the actuator includes a fourth opening, and
wherein, in the first position, the fourth opening is in fluid communication with the second opening and, when the actuator is in the second position, the fourth opening is not in fluid communication with the second opening.

4. An endoscope system, comprising:
the suction attachment according to claim 2 attached to the endoscope,
wherein the endoscope includes an insertion portion, a grasping portion, a suction conduit, and a socket,
wherein the suction conduit has an endoscope suction conduit provided in the insertion portion, and
wherein the socket is provided between the insertion portion and the grasping portion, and communicates with the endoscope suction conduit.

5. The suction attachment according to claim 1, wherein the actuator includes a seal, and
wherein, in the second position, the seal seals the second opening.

6. The suction attachment according to claim 5, wherein the seal is located on an inner peripheral of the interior cavity.

7. The suction attachment according to claim 5, wherein the second opening is provided in an end wall of the pressure regulator body,
wherein the seal is located on the actuator, and
wherein, in the second position, the seal contacts the second opening.

8. The suction attachment according to claim 5, wherein the second opening is in a side surface of the pressure regulator body, and
wherein the seal is located on the actuator.

9. The suction attachment according to claim 8, wherein, in the second position, the seal contacts the second opening on a surface of the interior cavity.

10. The suction attachment according to claim 8, wherein, in the second position, the seal contacts the second opening on an outer surface of the pressure regulator body.

11. The suction attachment according to claim 1, further comprising an attachment device configured to attach the suction attachment to a part of an endoscope,
wherein the attachment device is connected to the pressure regulator body.

12. The suction attachment according to claim 1, wherein the second tube is made of a resin material.

13. The suction attachment according to claim 1, wherein the plug further includes a treatment instrument insertion opening that allows a treatment instrument to be inserted into the plug.

14. The suction attachment according to claim 1, wherein at least a portion of the second tube is extendable and contractable in an axial direction of the second tube.

15. The suction attachment according to claim 1, wherein the actuator is movable between the first position and the second position by sliding with respect to the pressure regulator body.

16. The suction attachment according to claim 1, wherein the second opening is in an end wall or a side wall of the pressure regulator body.

17. The suction attachment according to claim 16, wherein the second opening comprises a plurality of holes.

18. The suction attachment according to claim 1, wherein the second opening allows gas to pass through, and prevents liquid from passing through.

19. The suction attachment according to claim 1, wherein the actuator is movable between the first position and the second position by (i) sliding in a direction of a longitudinal axis of the pressure regulator body or (ii) rotating about a longitudinal axis of the interior cavity.

20. The suction attachment according to claim 1, wherein the suction flow path bypasses the interior cavity of the pressure regulator body.

21. A suction attachment, comprising:
 a plug including a plug conduit;
 a first tube including a first conduit therein, wherein the first tube has a first end portion and a second end portion and wherein the second end portion connects to the plug with the first conduit in fluid communication with the plug conduit;
 a second tube including a second conduit therein, wherein the second tube has a third end portion and a fourth end portion and wherein the third end portion connects to the plug with the second conduit in fluid communication with the plug conduit; and
 a pressure regulator including a body with an interior cavity, a first opening, a second opening, and an actuator, wherein the pressure regulator is connected to the fourth end portion of the second tube and the interior cavity is in fluid communication with second conduit via the first opening in the body,
 wherein the second opening in the body connects the interior cavity to atmosphere,
 wherein the actuator is movable between a first position and a second position,
 wherein, when the actuator is in the first position, the second opening is open and, when the actuator is in the second position, the second opening is closed,
 wherein the plug further includes a plug cavity and a third opening in fluid communication with the plug cavity and configured to attach to a treatment instrument insertion opening of an endoscope,
 wherein a flow path from the second opening, through the interior cavity, the second conduit and the plug conduit, to the first conduit is a first flow path,
 wherein a flow path from the third opening, through the plug conduit, to the first conduit is a second flow path,
 wherein, in operation with the actuator in the first position, a flow rate of the first flow path is greater than a flow rate of the second flow path, and
 wherein, in operation with the actuator in the second position, the flow rate of the first flow path is less than the flow rate of the second flow path.

* * * * *